United States Patent
Zhou et al.

(10) Patent No.: US 12,552,273 B2
(45) Date of Patent: Feb. 17, 2026

(54) CHARGING PORT ALIGNMENT METHODS AND APPARATUS FOR ROBOTIC CAR CHARGERS

(71) Applicant: Procom Engineering, Inc., Aliso Viejo, CA (US)

(72) Inventors: Wesley Zhou, Aliso Viejo, CA (US); Shepherd Darquea, Carson City, NV (US); Morgan Simpson, Carson City, NV (US)

(73) Assignee: Procom Engineering, Inc., Aliso Viejo, CA (US)

( * ) Notice: Subject to any disclaimer, the term of this patent is extended or adjusted under 35 U.S.C. 154(b) by 748 days.

(21) Appl. No.: 17/962,418

(22) Filed: Oct. 7, 2022

(65) Prior Publication Data

US 2023/0373323 A1 Nov. 23, 2023

Related U.S. Application Data

(63) Continuation-in-part of application No. 17/748,672, filed on May 19, 2022, now abandoned.

(51) Int. Cl.
*B60L 53/16* (2019.01)
*H01R 13/627* (2006.01)

(52) U.S. Cl.
CPC .......... *B60L 53/16* (2019.02); *H01R 13/6272* (2013.01)

(58) Field of Classification Search
CPC ............................. B60L 53/16; H01R 13/6272
USPC ......................................................... 320/109
See application file for complete search history.

(56) References Cited

U.S. PATENT DOCUMENTS

| 6,382,269 | B1 | 5/2002 | Tatsuno |
| 9,056,555 | B1 * | 6/2015 | Zhou ........................ B60L 53/35 |
| 9,266,440 | B2 * | 2/2016 | Gao ......................... B60L 53/35 |
| 9,527,394 | B1 * | 12/2016 | Tang ...................... B60W 10/26 |
| 10,471,829 | B2 * | 11/2019 | Yellambalase ........ B60L 3/0046 |
| 10,899,246 | B1 * | 1/2021 | Babu .................. G02B 27/0006 |
| 11,219,165 | B1 * | 1/2022 | Meng ................... B62D 15/025 |
| 11,279,252 | B1 * | 3/2022 | Alan ....................... B60L 53/16 |

(Continued)

FOREIGN PATENT DOCUMENTS

WO WO-2017215821 A1 * 12/2017 ............ H02J 7/0042

OTHER PUBLICATIONS

What are Neural Networks, IBM Cloud, Aug. 15, 22, 12 pages.
(Continued)

*Primary Examiner* — Suresh Memula
(74) *Attorney, Agent, or Firm* — Georgiy L. Khayet

(57) ABSTRACT

An apparatus for interconnecting a vehicle charging connector with a charging port of a vehicle wherein a latch arm is slidably mounted in the charging connector to slide toward and away from the charging port and toward and into an opening in the charging port. A tip portion is positioned on the latch arm so as to be insertable downwardly into a cavity formed in an interior surface of the opening of the charging port and a linear actuator is configured to drive the latch arm towards and away from the charging connector. In an illustrative embodiment, the charging connector comprises part of a robot configured to move the tip of the latch arm downwardly into the cavity in the opening of the charging port to enable pulling the charging connector and charging port together to establish electrical contact.

3 Claims, 28 Drawing Sheets

(56) References Cited

U.S. PATENT DOCUMENTS

| | | | |
|---|---|---|---|
| 2013/0076902 A1* | 3/2013 | Gao | B25J 9/042 |
| | | | 348/148 |
| 2013/0193919 A1 | 8/2013 | Hill et al. | |
| 2014/0354229 A1* | 12/2014 | Zhao | B60L 53/68 |
| | | | 320/109 |
| 2017/0008411 A1* | 1/2017 | Wu | B60L 53/65 |
| 2017/0269589 A1* | 9/2017 | Clarke | A63H 29/22 |
| 2017/0318921 A1* | 11/2017 | Gharabegian | F24S 30/452 |
| 2019/0231160 A1 | 8/2019 | Lu et al. | |
| 2020/0022553 A1 | 1/2020 | Gill et al. | |
| 2020/0061811 A1 | 2/2020 | Iqbal et al. | |
| 2020/0258254 A1 | 8/2020 | Packwood et al. | |
| 2020/0275815 A1 | 9/2020 | Furuta et al. | |
| 2020/0285910 A1 | 9/2020 | Steelberg et al. | |
| 2021/0078424 A1 | 3/2021 | Haddad et al. | |
| 2021/0197683 A1 | 7/2021 | Graham et al. | |
| 2021/0197684 A1 | 7/2021 | Graham et al. | |
| 2021/0198093 A1 | 7/2021 | Graham et al. | |
| 2021/0264175 A1 | 8/2021 | Zhang et al. | |
| 2021/0264557 A1 | 8/2021 | Mao et al. | |
| 2021/0276433 A1 | 9/2021 | Mandel-Senft et al. | |
| 2021/0295472 A1 | 9/2021 | Du | |
| 2021/0330289 A1 | 10/2021 | Mwikirize et al. | |
| 2021/0334644 A1 | 10/2021 | Yu et al. | |
| 2023/0373323 A1* | 11/2023 | Zhou | B60L 53/16 |
| 2024/0246439 A1* | 7/2024 | Matsui | B65H 75/446 |
| 2025/0146954 A1* | 5/2025 | Wang | G01N 21/9009 |
| 2025/0159110 A1* | 5/2025 | Shin | H04N 7/18 |
| 2025/0164996 A1* | 5/2025 | Cristache | B60L 53/57 |

OTHER PUBLICATIONS

Jetson Nano Specifications downloaded Nov. 26, 2021, 6 pages.
An introduction to neural networks by Blais, et al., published Jul. 1, 2001, updated Aug. 20, 2018, 10 pages.
Redeagle CCTV 1000TVL Mini Home Security Video Surveillance Camera 6 IR LEDs Smallest Analog Cameras, https://www.aliexpress.com, Nov. 9, 2021, 4 pages.

* cited by examiner

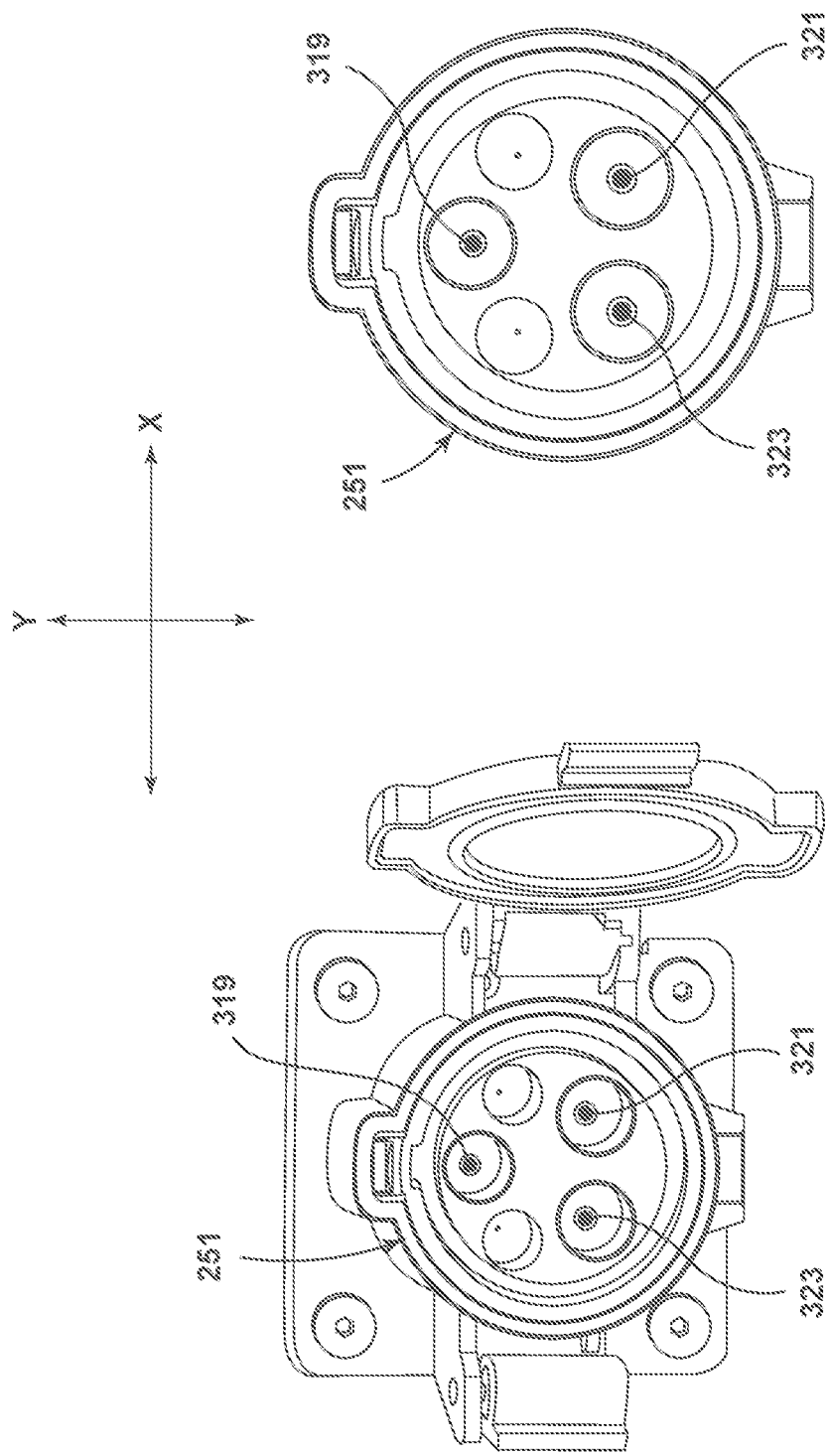

CHARGING PORT ALIGNMENT METHODS AND APPARATUS FOR ROBOTIC CAR CHARGERS

RELATED APPLICATION

The subject application is a continuation-in-part of U.S. patent application Ser. No. 17/748,672, filed May 19, 2022, and entitled "CHARGING PORT ALIGNMENT AND INTERCONNECTION METHODS AND APPARATUS FOR ROBOTIC CAR CHARGERS," the contents of which application is hereby incorporated by reference in its entirety in this application.

FIELD OF THE DISCLOSURE

The subject disclosure relates to methods and apparatus for robotically charging electric vehicles and more particularly to apparatus which facilitates the establishment of electrical connection between a robot charging connector and a charging socket of an electrically powered vehicle by employing computer vision to align a charging connector with the vehicle's charging port. Electric vehicles may include, inter alia, vehicles which are powered in whole or in part by one or more electric motors or other electric powered means.

DESCRIPTION OF RELATED ART

Robotic vehicle charging apparatus has been disclosed in the past, for example, as illustrated in U.S. Pat. No. 9,056,555 entitled "Vehicle Charge Robot," the contents of which is incorporated by this reference herein in its entirety.

SUMMARY

According to disclosure below, electrical vehicle charging apparatus is provided comprising an electrical connector including an array of receptacles configured to receive and establish electrical connection with respective mating pins of a vehicle's charging port. A camera is located within the array of receptacles, the camera defining an X-Y plane, the camera being positioned to generate an electronic image of the vehicle's charging port and features within the charging port such as mating electrical connection pins. In an alternate embodiment, the connector may include an array of pins and the charging port may include an array of mating receptacles and a camera located within the array.

According to an illustrative embodiment, a method of interconnecting a vehicle charging connector with a charging port of a vehicle is provided comprising providing the charging connector with a latch arm; constructing the latch arm and charging connector such that the latch arm can be extended from the charging connector into an opening in the charging port and such that the latch arm has a tip portion positioned to insert downwardly into a cavity formed in an interior surface of the opening of the charging port; and employing the latch arm and tip portion to pull the charging connector and the charging port together so as to establish electrical interconnection between them. In one embodiment the latch arm is extended into the charging port such that the tip portion lies above the charging port cavity and then the arm and tip portion are moved down such that the tip portion engages the cavity.

According to another illustrative embodiment, the method may or may not further comprise attaching the latch arm and a camera mounting member to a plate and employing a linear actuator to drive the plate along with the attached latch arm and camera mounting member towards and away from the charging port.

Another illustrative embodiment comprises an apparatus for interconnecting a vehicle charging connector with a charging port of a vehicle comprising a latch arm slidably mounted in the charging connector to slide toward and away from the charging port and toward and into an opening in the charging port and a tip portion positioned on the latch arm so as to be insertable downwardly into a cavity formed in an interior surface of the opening of the charging port so as to engage the tip portion with the cavity.

In another illustrative embodiment, the apparatus may further comprise a camera mounting member having a tube portion and being slidably mounted in the charging connector, a rear end of the tube portion and a rear end of the latch arm being attached to a movable plate, and a linear actuator configured to drive the latch arm towards and away from the charging connector. In another illustrative embodiment, the charging connector may be part of a robot configured to move the tip of the latch arm downwardly into the cavity of the charging port.

Any of the embodiments described above may comprise methods or apparatus for aligning pins/receptacles of a vehicle charging port to mate with receptacle/pins of a robot charging plug comprising positioning a camera to view the vehicle charging port and to generate an image of the charging port; employing computer vision software to use the image to determine an offset between one of the pins and one of the receptacles and to generate one or more motor control signals. Such embodiments may or may not further comprise employing the one or more motor control signals to correct the offset.

DESCRIPTION OF THE DRAWINGS

FIG. 15 is a front perspective view of a vehicle charging port seen by a camera positioned above the vehicle charging port;

FIG. 16 is a front view of the charging port of FIG. 15 as seen by a camera pointed straight at the port.

DETAILED DESCRIPTION

Figure 1:
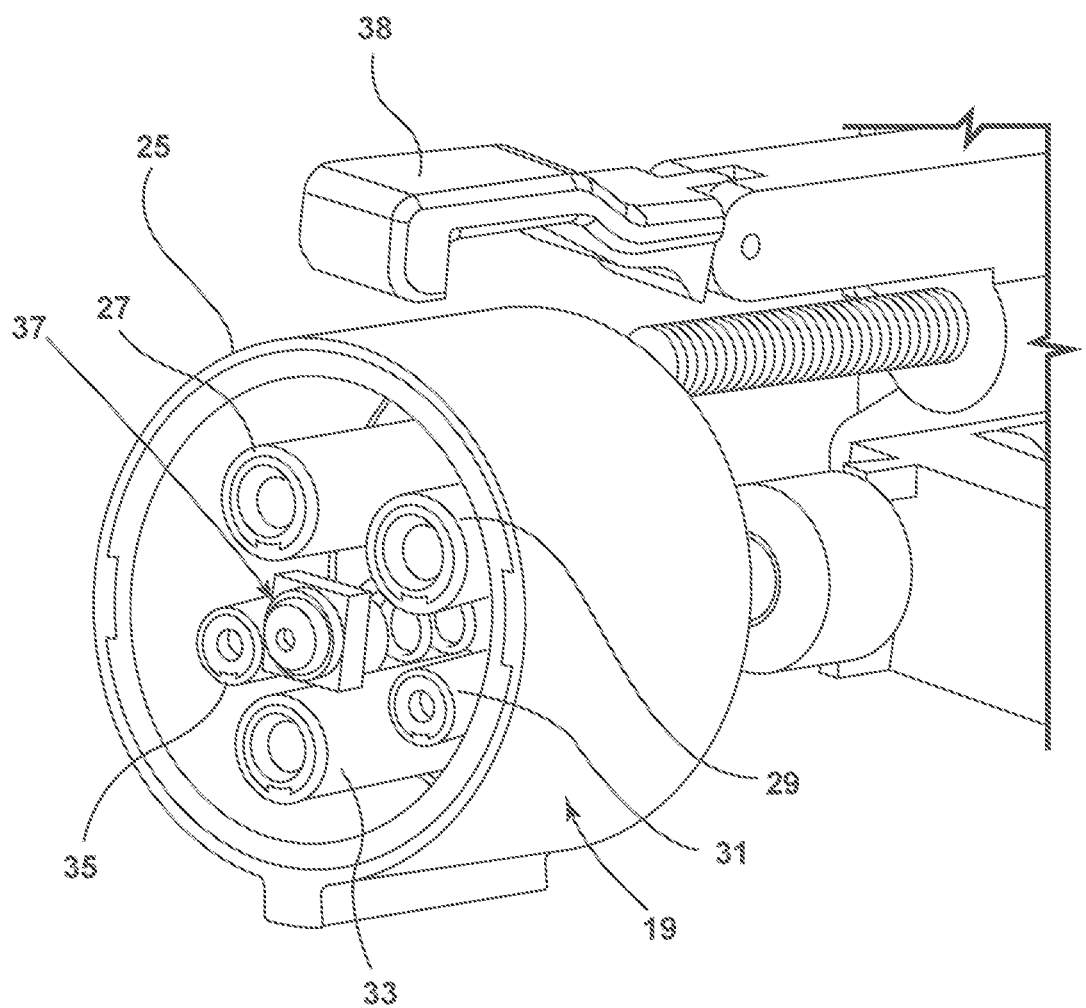
FIG. 1 is a perspective view of a vehicle charging robot according to an illustrative embodiment.

A vehicle charging connector or "plug" 19 is illustrated in more detail in FIG. 1. In illustrative embodiments, the connector 19 may be an SAE 1772 or other connector, which is configured to plug into a corresponding socket of a vehicle. As shown, in one embodiment, the connector 19 includes a latch 38 and an outer cylinder 25, within which are positioned five linearly projecting cylindrical female pin receptacles or "charging port holes" 27, 29, 31, 33, 35, which are configured to receive and establish electrical connection with respective mating pins of the vehicle's charging port. Different pin and plug arrangements may be used in various embodiments.

In the illustrative embodiment, a computer vision camera 37 is centrally positioned within the outer cylinder 25. An example of such a camera 37 is a miniature infrared camera such as a REDEAGLE CCTV 1000TVL Mini Home Security Video Surveillance Camera employing 6 IR (infrared) LEDs and a centrally located lens. In the illustrative embodiment, the camera 37 retracts once the connector 19 is properly aligned with the vehicle charging port in order to prevent the port from blocking the camera's view and to enable successful plug-in by avoiding potential collision between the port and camera.

Figure 2:
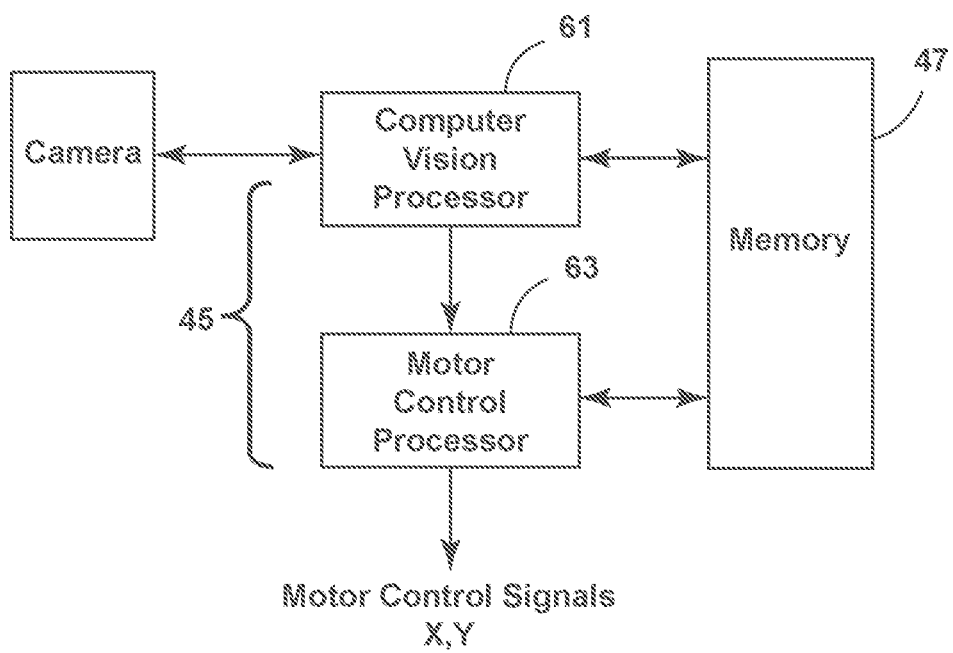
FIG. 2 is a circuit block diagram of control of control circuitry employed in an illustrative embodiment.

In one illustrative embodiment, a controller 45 shown in FIG. 2 is employed to control the position of the connector 19 and camera 37. In an illustrative embodiment, the controller 45 may comprise a microprocessor-based system or other computing device capable of executing programmed instructions to process input signals such as the input from the camera 37 and provide output control signals as required to control the position of the connector 19 with respect to the charging socket of the vehicle. In one embodiment, the controller 45 is configured to receive camera input signals and to provide output control signals e.g. X, Y, in order to the drive the connector positioning electric motors of a robot. In one embodiment, the controller 45 includes non-transitory executable instructions stored in a non-transitory computer readable medium or memory 47. The executable instructions serve, inter alia, to cause generation of suitable control signals to cause the connector 19 to perform the movements and functions described herein in more detail below in connection with FIGS. 4-7.

In illustrative embodiments, communication of the camera image to the computer vision processor 61 and from the processor 61 to the motor control processor 63 may be achieved using industry standard signal protocols. For example, in an illustrative embodiment, camera to processor communication can employ the industry standard MIPI CSI-2 protocol, or USB, while the processor 61 can communicate with the motor controller 63 using a standard SPI protocol.

In one illustrative embodiment shown in FIG. 2, the robot control circuitry comprises two circuit boards, one being a computer vision circuit board 61 and the other being a circuit board 63 comprising, for example, a microprocessor or microcontroller which controls the robot motors and other hardware. In one embodiment, the computer vision circuit board 61 may be a Nvidia Jetson Nano comprising a Quad-core ARM® Cortex®-A57 MPCore processor and a 4 GB 64-bit LPDDR4 memory. The Jetson Nano employs an installed operating system, which may be, for example, Ubuntu, a version of Linux, and can be programmed to provide the artificial intelligence and computer vision functions hereinafter described. See https://www.nvidia.com/en-us/autonomous-machines/embedded-systems/jetson-nano/. Other off-the-shelf or custom circuitry providing such functions may alternatively be employed.

Figure 3:
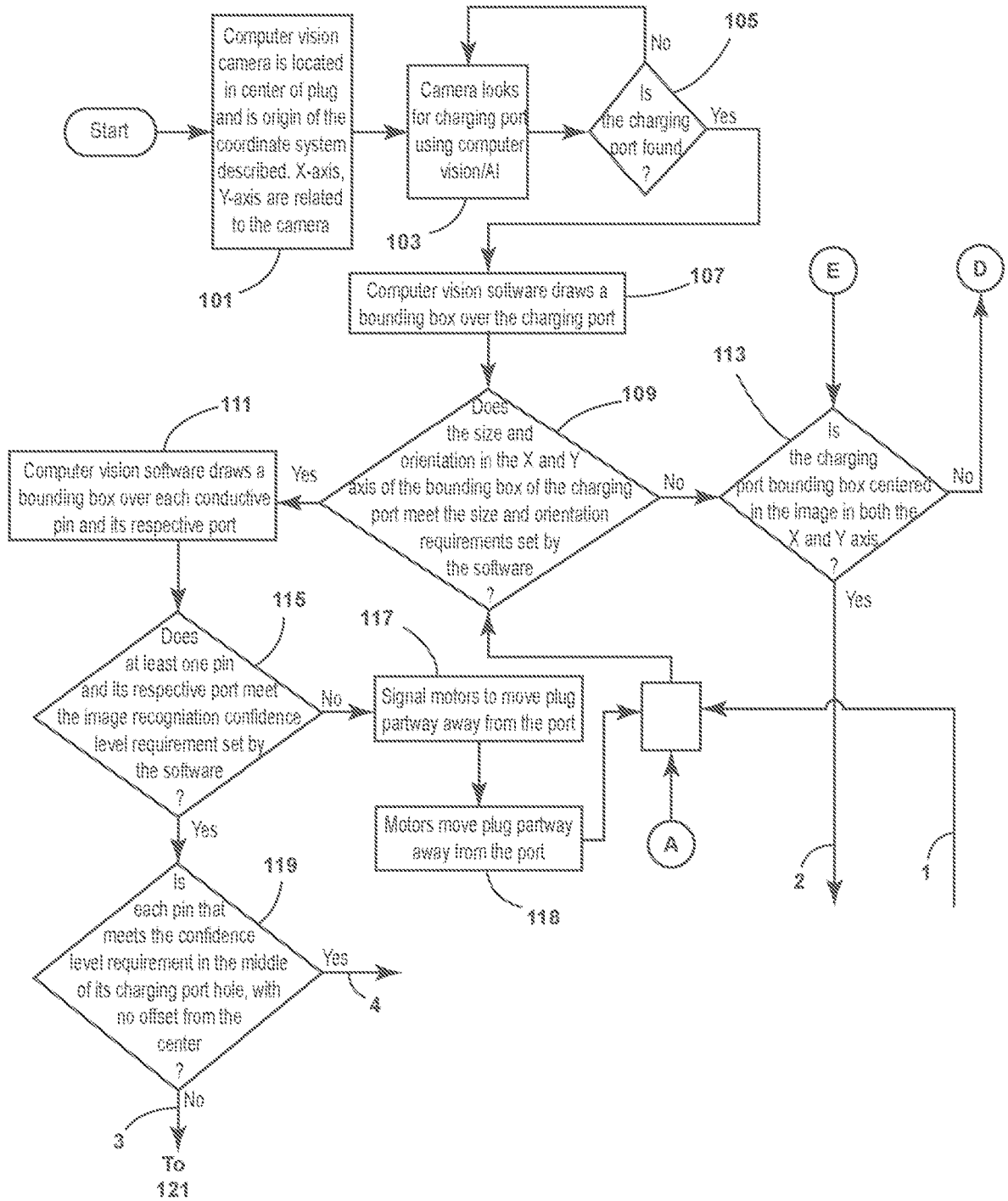
FIG. 3 is a flowchart illustrating steps performed by the computer vision software of the illustrative embodiment.
Figure 4:
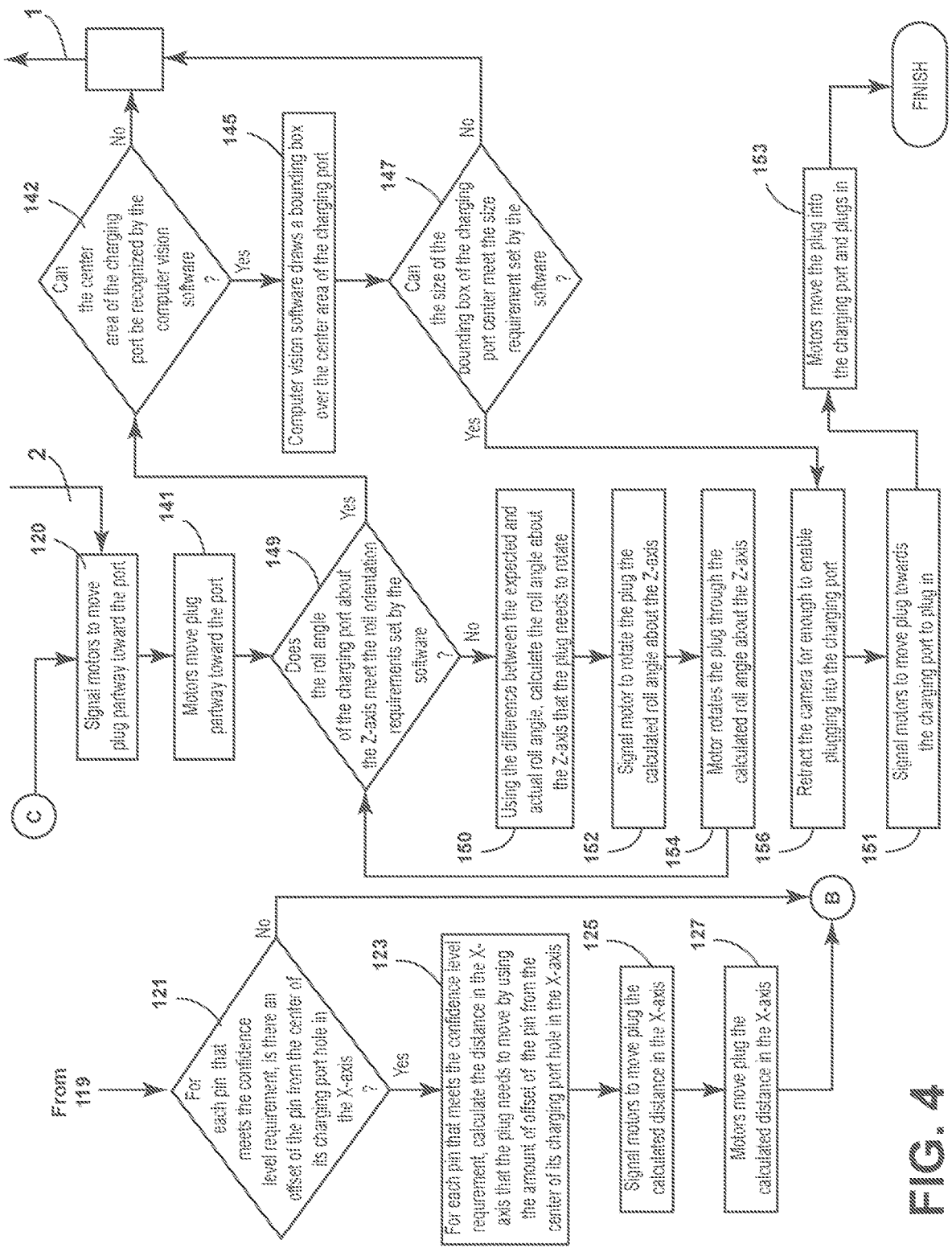
FIG. 4 is a continuation of the flowchart of FIG. 3.

According to the illustrative embodiment, the computer vision camera 37 is located in the center of the connector 19 and is the origin of an X axis, Y axis coordinate system as referenced in block 101 of FIG. 3. In step 103, the camera 37 looks for the vehicle charging port using computer vision/AI. At step 105, a test is performed to determine whether the charging port has been found. If it has not, the flow returns to step 103 and when the car charging port is found, the flow proceeds to step 107 where the software draws a bounding box around the charging port.

In an illustrative embodiment, the computer vision software is "trained" on recognizing the charging port and associated components by using labeled data sets of objects using, for example, known machine learning methods to learn from hundreds or thousands of images of charging ports so that the software can recognize that the electronic image which the camera 37 is transmitting is a charging port.

Once the bounding box has been drawn, the flow proceeds to test 109 where the software determines whether the size and orientation in the X and Y axes of the bounding box of the charging port meet pre-programmed size and orientation requirements in the software. If so, in step 111, the computer vision software draws a bounding box over each of the five conductive pins of the vehicle charging port and over its respective port in step 111. If not, the flow proceeds to test 113 where the software determines whether the charging port bounding box is centered on the charging port image in both the X and Y axes and if it is not, the flow proceeds to entry point D of FIG. 5.

Assuming step 111 is performed, the flow proceeds to test 115 where it is determined whether at least one pin and its respective port meet the image recognition confidence level requirement programmed into the software. If not, steps 117 and 118 are performed where the motors are signaled to move the plug 19 away from the vehicle port whereafter the flow returns to test 109.

If test 115 is satisfied, the flow proceeds to test 119 where it is determined whether each pin of the vehicle charging port or each of a subset of the pins that meet the confidence level requirement is located in the middle of its respective charging port hole 27, 29, 31, 33, 35, with no offset from the center within a confidence level requirement set in the software. If not, the flow proceeds to determine X and Y axis adjustments required to center each pin or the subset of pins.

In particular, steps 121, 123, 125, and 127 are performed wherein, for each pin that meets the confidence level requirement, the software calculates the distance in the X-axis that the plug 19 needs to move by using the amount of offset of the pin from the center of its charging port hole in the X-axis and signals the motors to move the plug the calculated distance in the X axis in response to which the motors move the plug the calculated distance in the X axis. Then, in step 129 (FIG. 5), the software performs tests to determine whether, for each pin that meets the confidence level requirement, there is an offset of the pin from the center of its charging port hole in the Y-axis. If so, then in steps 131, 133 and 135, for each pin that meets the confidence level requirement, the software calculates the distance in the Y-axis that the plug 19 needs to move by using the amount of offset of the pin from the center of its charging port hole in the Y-axis and signals the motors to move the plug the calculated distance in the Y-axis after which the motors move plug 19 the calculated distance.

Once these X and Y adjustments have been made, a test 137 (FIG. 5) is performed to determine whether each charging pin is centered in its charging port hole. If it is, the flow proceeds to entry point C (FIG. 4) where steps and tests are performed to ultimately cause the motors to plug the connector 19 into the vehicle charging port. In particular, in step 141, the motors move the plug 19 toward the charging port and a test 149 is performed to determine if the roll angle of the charging port about the Z axis meets the roll orientation requirements set by the software. If so, a test 142 is performed to determine whether the center of the charging port can be recognized by the computer vision software and, if so, in step 145, the computer vision software draws a bounding box over the center area of the charging port and determines in test 147 whether the size of the bounding box meets the size requirement set by the software. If so, in steps 156, 151, and 153, a motor retracts the camera far enough to enable the plug 19 to be inserted into the charging port, the motors are signaled to move plug 19 towards the charging port, and finally to plug the plug 19 into electrically connected position with the charging port.

If the roll angle does not meet requirements in test 149, steps 150, 152, and 154 are performed where the difference between the expected and actual roll angle is used to calculate the roll angle about the Z axis that the plug 19 needs to rotate in order to meet the expected roll angle, the motors are signaled to rotate the plug 19 through the calculated roll angle then rotates the plug 19 through the calculated roll angle. Test 149 is then performed again to confirm that the proper roll angle has been achieved.

Figure 5:
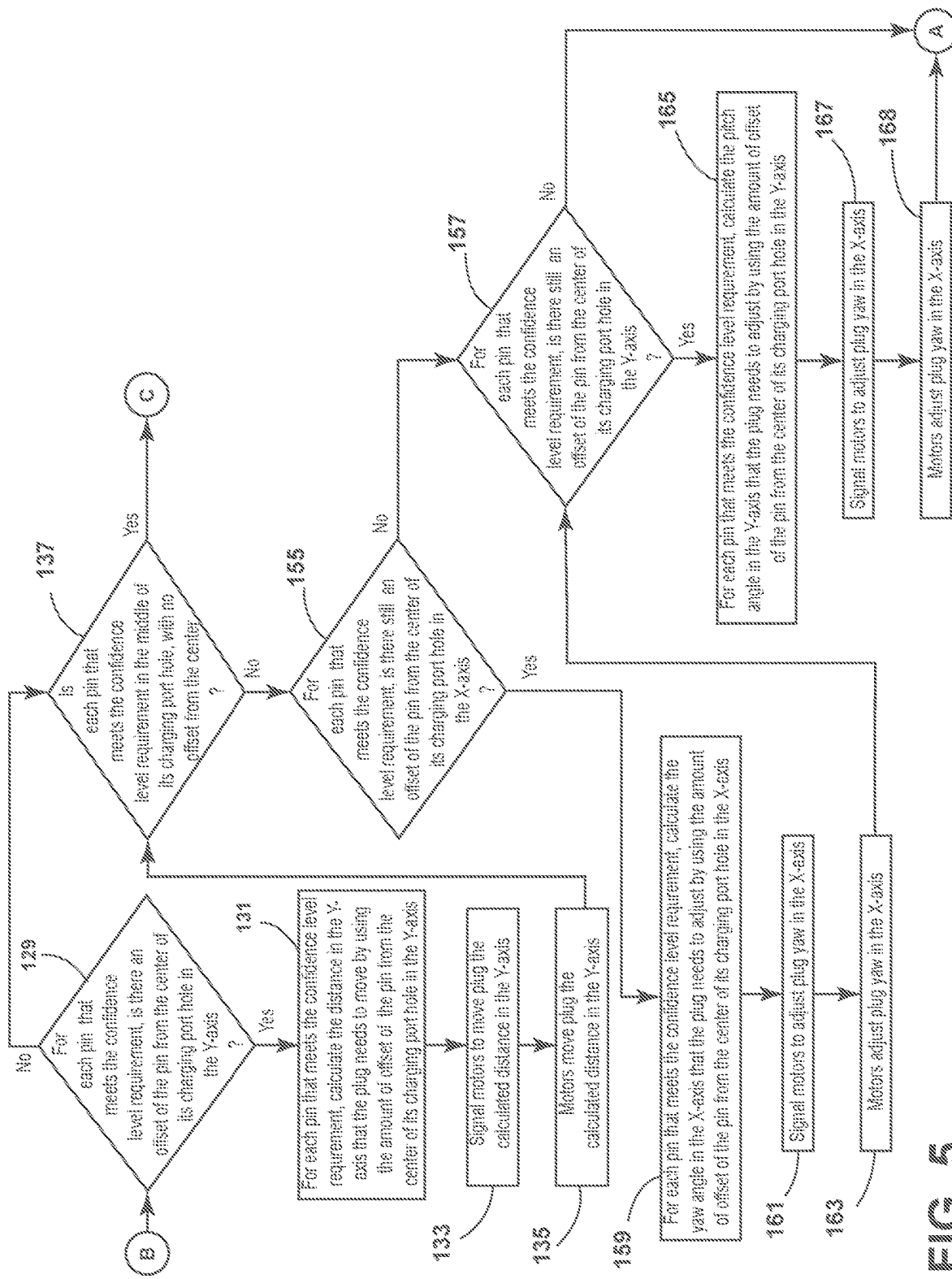
FIG. 5 is a flowchart illustrating further steps performed by the computer vision software.
Figure 6:
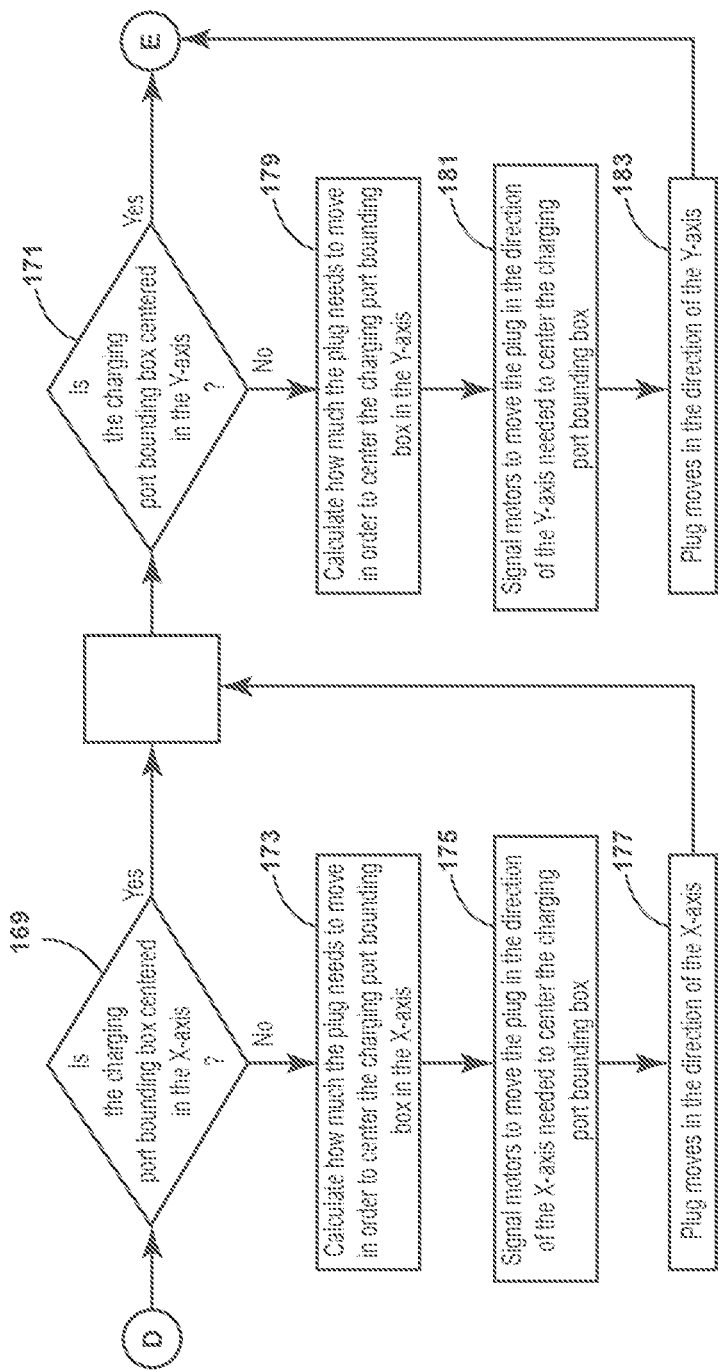
FIG. 6 is a flowchart illustrating further steps performed by the computer vision software.

The remaining steps in the illustrative flowcharts are performed in response to various misalignment detections. For example, if test 137 of FIG. 5 is not satisfied, tests 155, 157 are performed to detect X and Y misalignment conditions and steps 165, 167, 168 are performed to calculate and correct the misalignment. Similarly, if test 113 of FIG. 3 is not satisfied, the flow proceeds to entry point D of FIG. 6 to perform tests 169, 171 and steps 173, 175, 177 and 179, 181, 183 to calculate and correct for any X and Y misalignment of the charging port bounding box.

Figure 7:
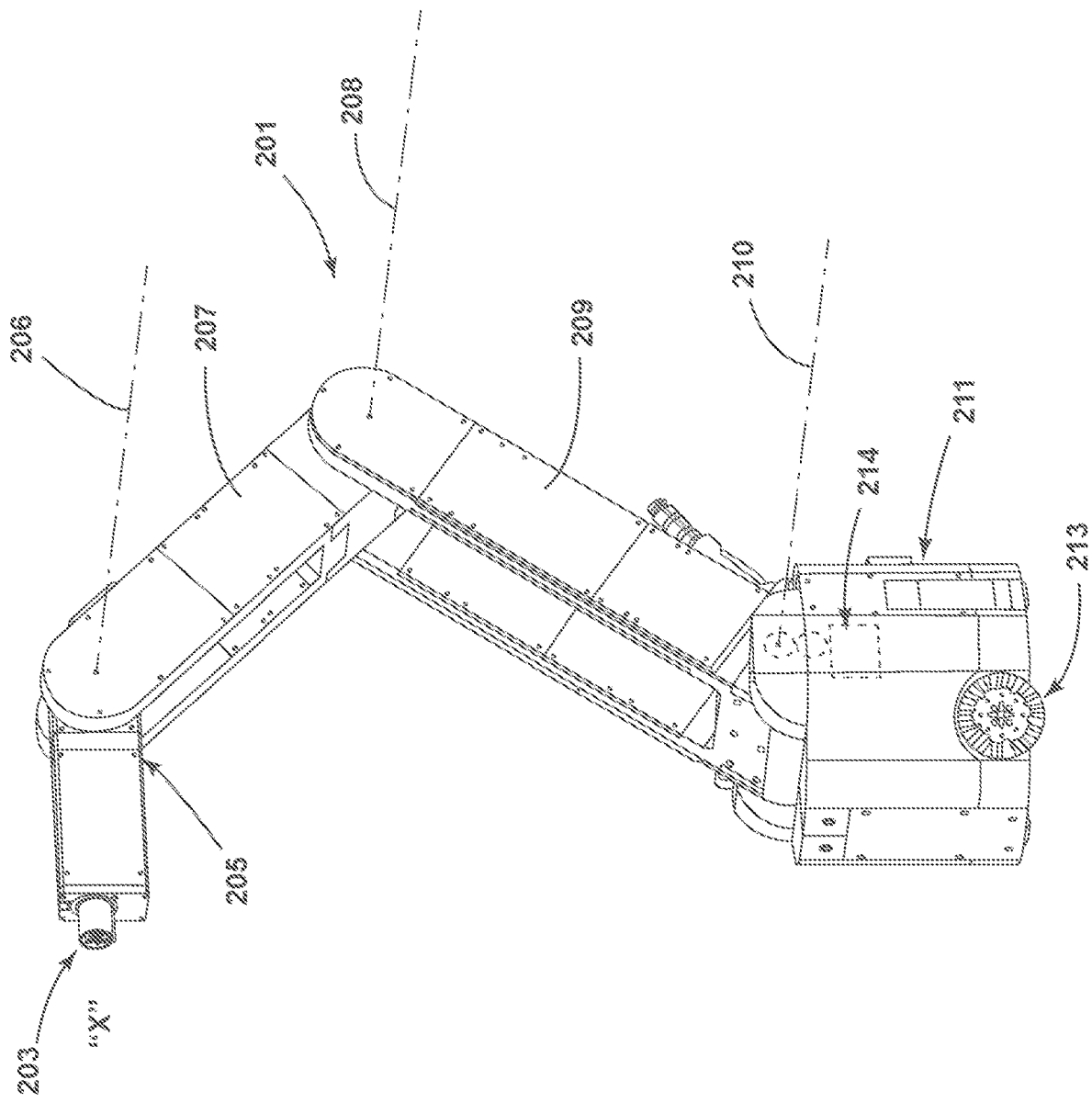
FIG. 7 is a perspective view of an illustrative vehicle charging robot.

FIGS. 7-13 show an illustrative robot 201 with illustrative drive mechanisms for positioning the connector 19 as described in the flow charts of FIGS. 3-6. According to FIG. 7, the illustrative robot 201 includes a camera and latch system 203, robot arms 207, 209, and a robot base 211 having motor driven wheels 213. FIG. 7 further illustrates a joint 205 for Z axis roll and joints for enabling pivotal motion about first, second and third axes 206, 208, 110.

Figure 8:
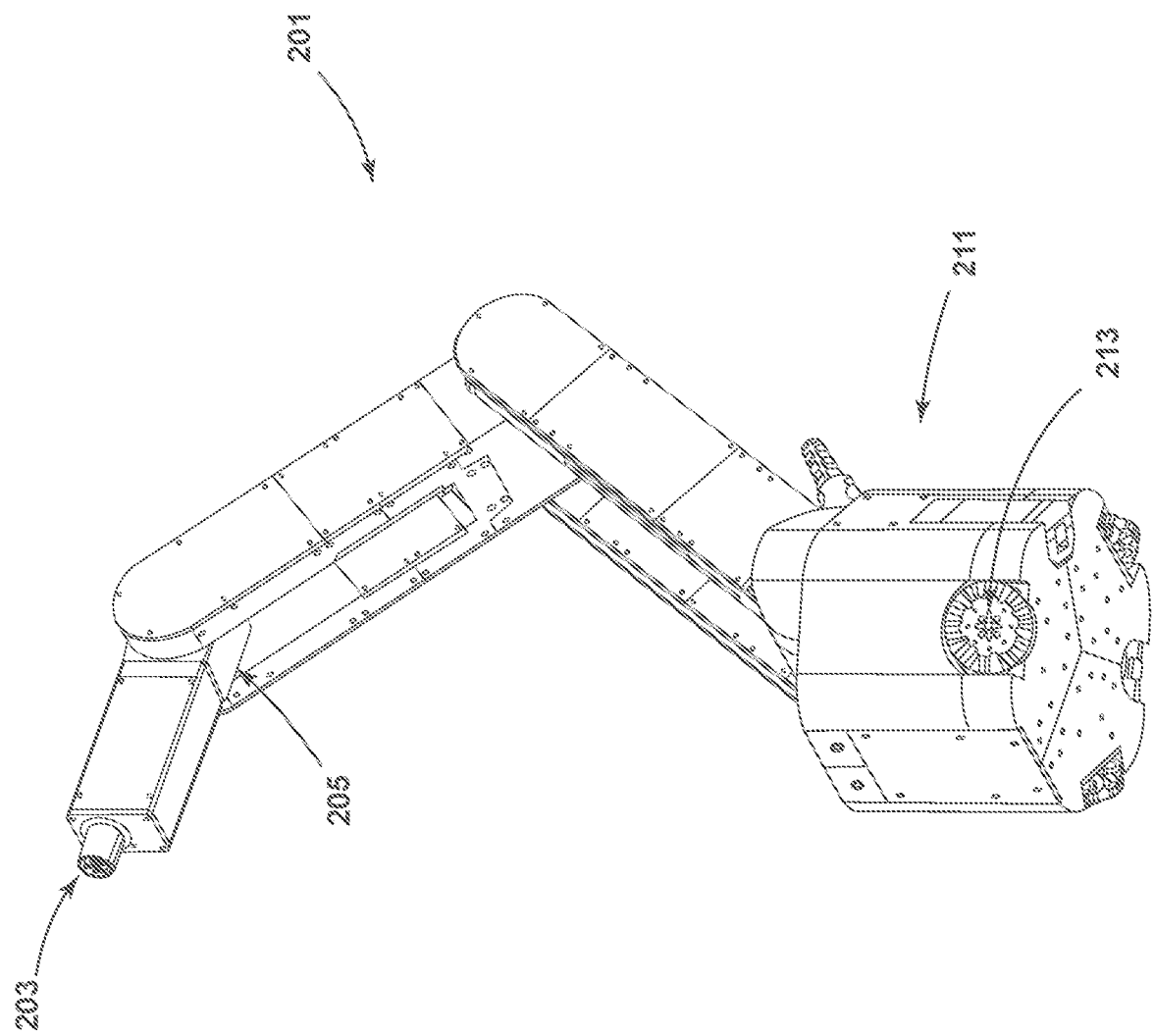
FIG. 8 is a second perspective view of the illustrative robot.
Figure 9:
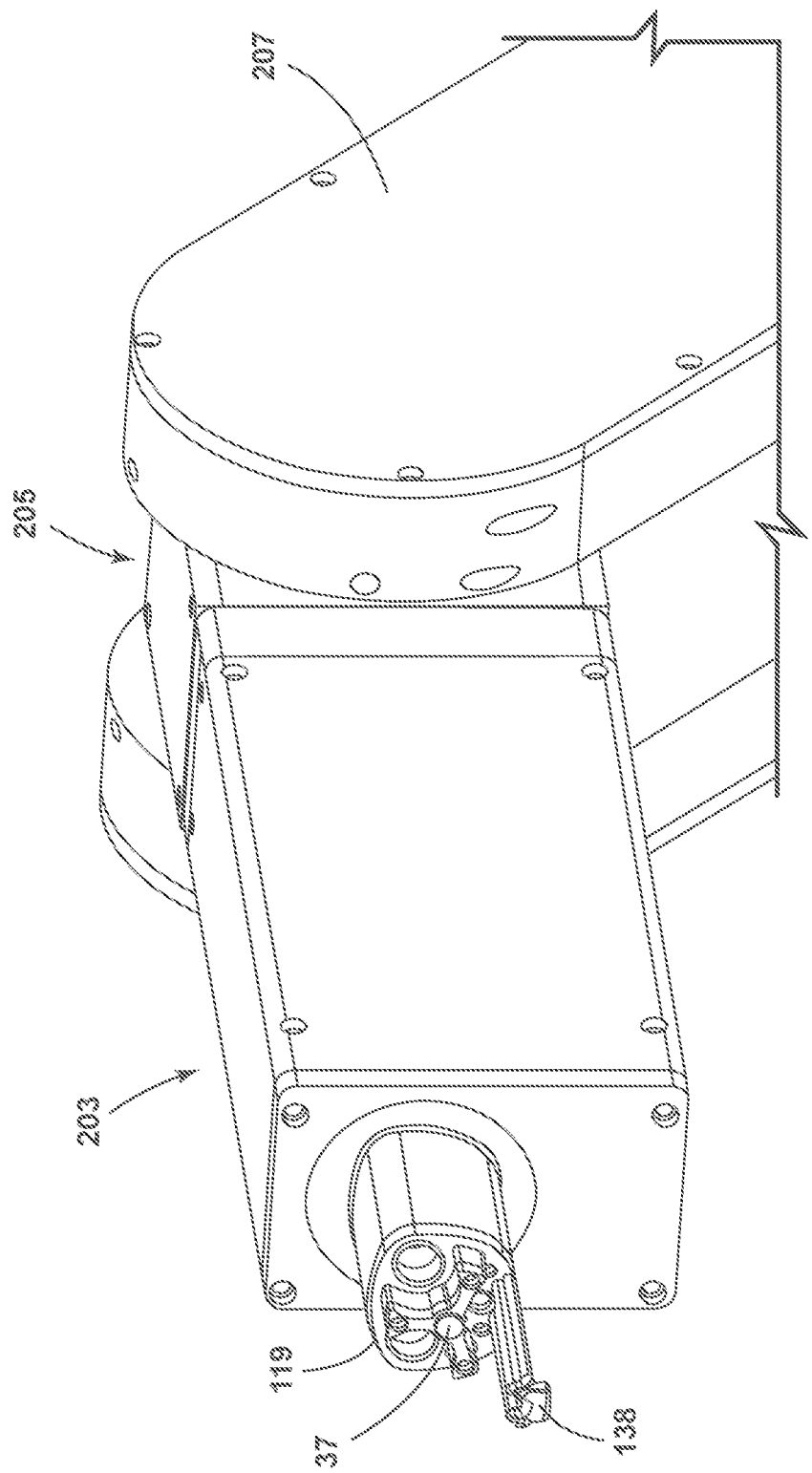
FIG. 9 is a perspective view illustrating the robot's latching mechanism and camera in an extended position.
Figure 10:
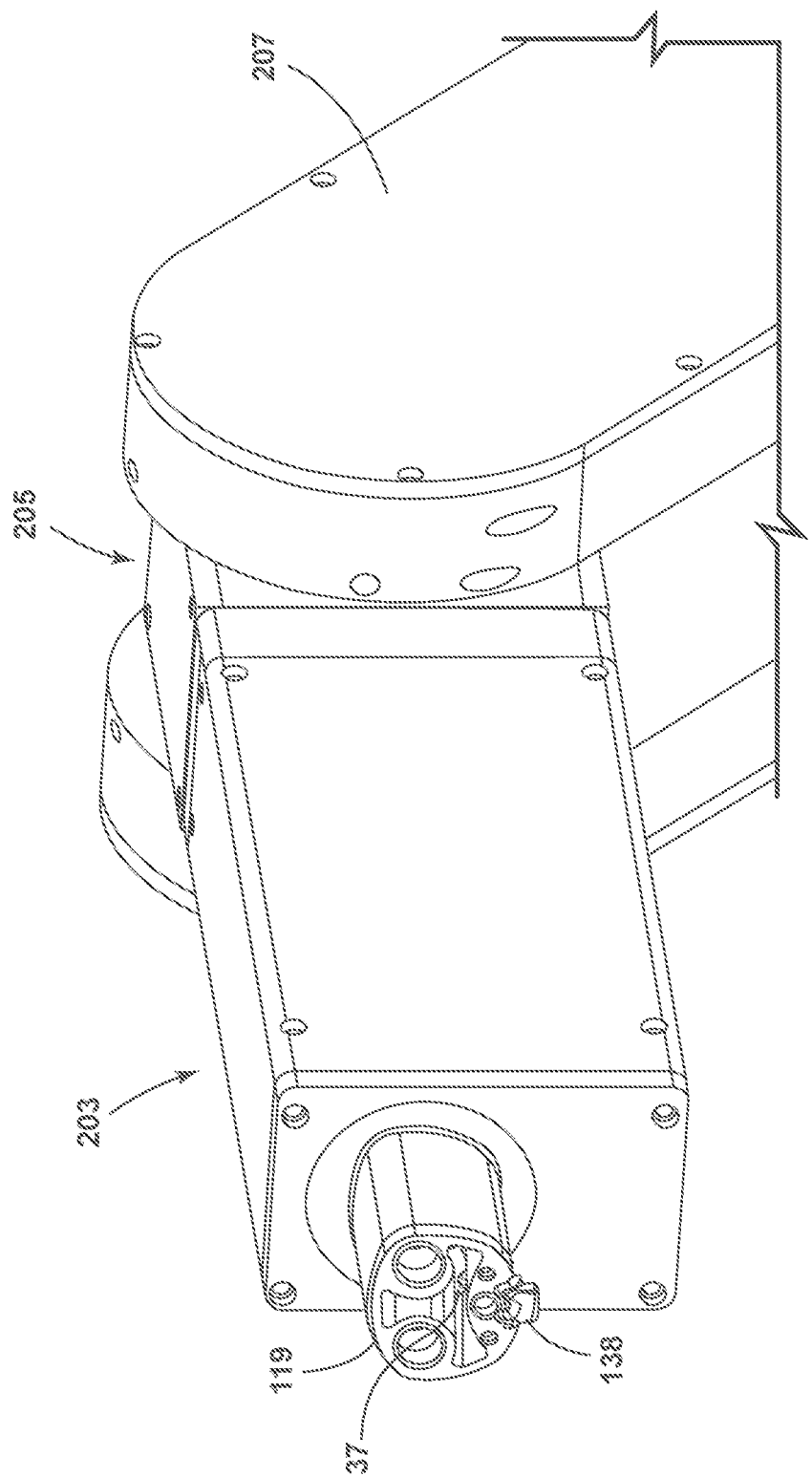
FIG. 10 is a perspective view illustrating the robot's latching mechanism and camera in a retracted position.
Figure 11:
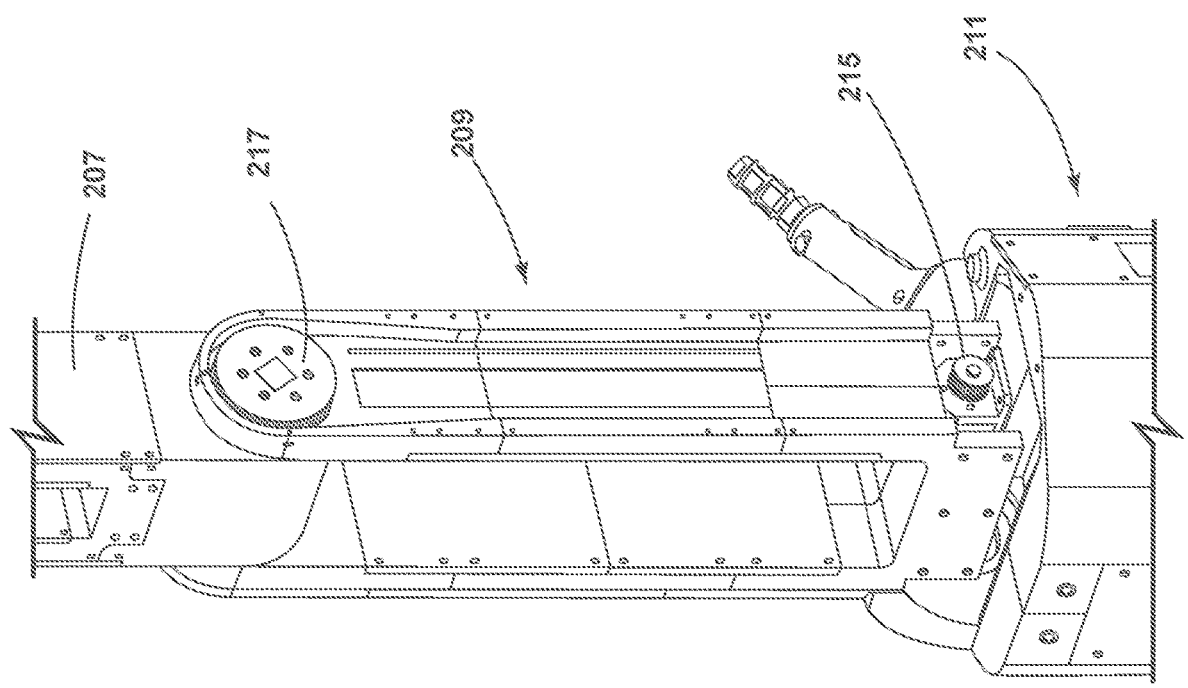
FIG. 11 is a perspective view illustrating a portion of the motor drive componentry employed in the illustrative robot.
Figure 12:
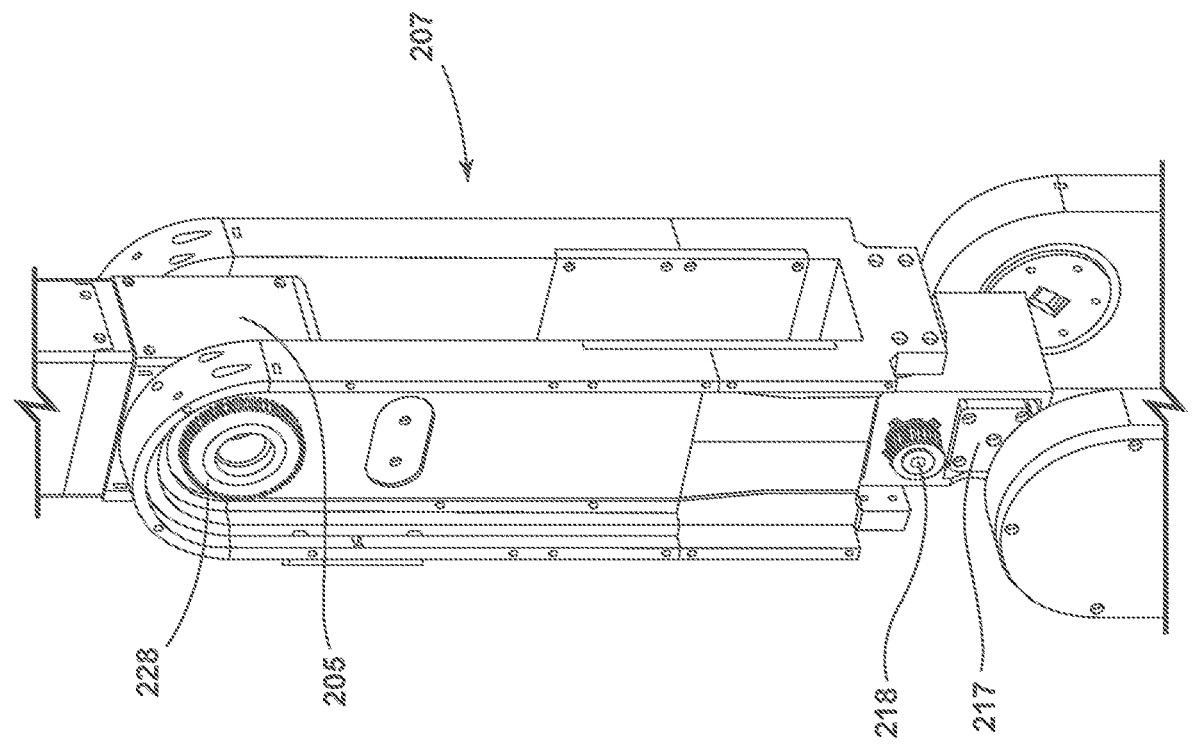
FIG. 12 is a perspective view illustrating a portion of the differential drive gear componentry employed in the illustrative robot.

FIG. 8 shows three individually motor-driven omni-wheels 213 for moving the robot plug in the X axis, adjusting yaw in the X axis, and for moving the robot towards and away from an electric vehicle. FIGS. 9 and 10 illustrate a latching mechanism 138 in the extended and retracted position, respectively. FIG. 11 illustrates a motor drive gear 215 to power movement about axis 208 via a belt gear drive supplied to a gear 217, while FIG. 12 illustrates one of two oppositely disposed motors 218, each powering one side of a differential gear 221 via gears 228 shown in FIG. 13 via a belt drive system.

Figure 14:
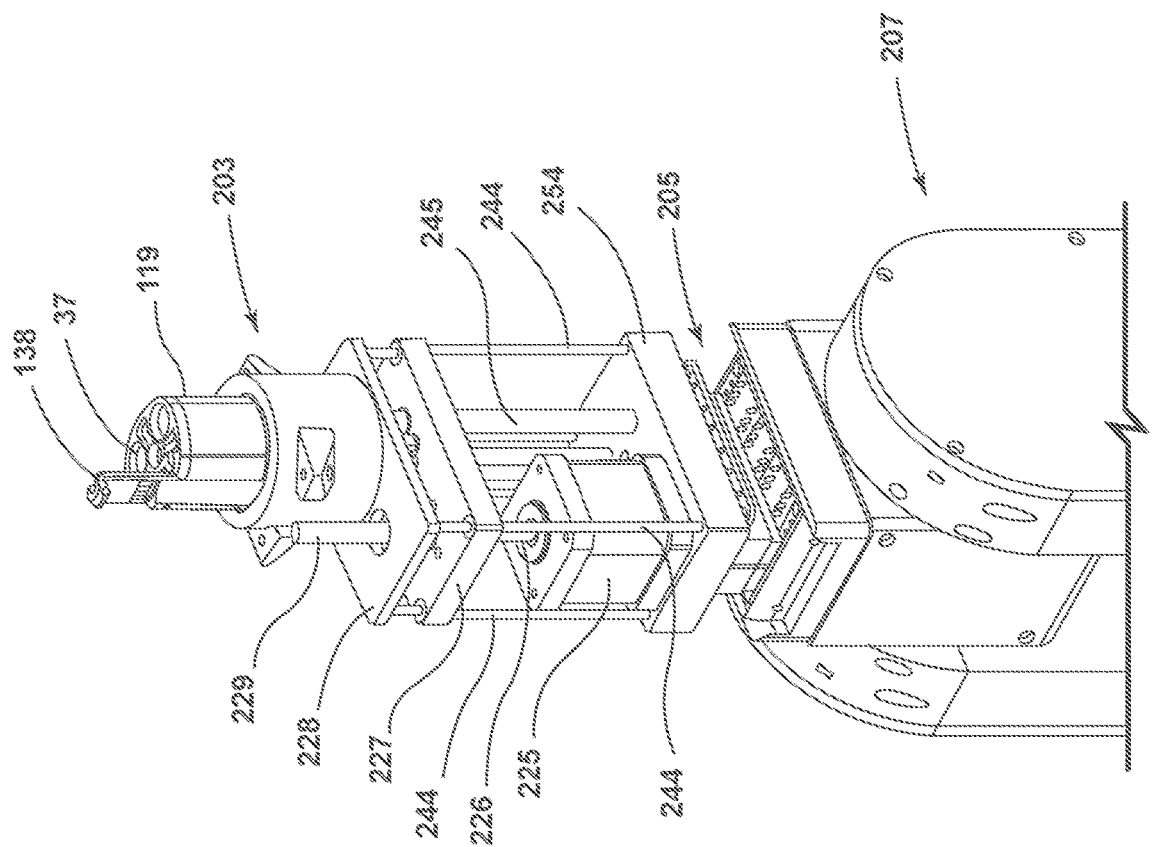
FIG. 14 is a perspective view illustrating a linear drive apparatus for extending and retracting a latch and camera assembly according to an illustrative embodiment.

The differential gear system 221 includes a left gear 219 and a right gear 223 and upper and lower gears 222, 224. When driven together, the gears 221, 222, 223, 224 cause the third joint to adjust pitch in the Y axis. When only the left- or right-side gear 219, 223 is driven, the third joint is caused to adjust roll in the Z axis. FIG. 14 illustrates an embodiment wherein a linear drive motor 225 drives movement of a plate 227 to retract and extend the latch and camera mechanism 203.

As those skilled in the art will appreciate, assuming that "X" (FIG. 7) is the target charging port, the Y position of the connector 119 is determined by the combined angle/position of the second and third joints 208, 210 shown in FIG. 7. The manner in which the higher joint 208 is moved is shown in FIG. 11 where 215 is the motor which is connected to the joint gear 217 to control the rotational position of the joint 208. The angular or rotational position of the lower joint 210 is controlled, for example, by a motor and an associated gear and belt drive system 214 located in the lower housing 211.

FIG. 15 shows a vehicle charging port 251 having receptacles 311. 313, 319 wherein mating pins 319, 321, 323 are respectively positioned, and in an illustrative embodiment are slightly recessed into the port circles. In the image of FIG. 15, the pins look closer to the top of each circle rather than the middle because the camera 37 is positioned above the port 251, creating the illusion of the offset. FIG. 16 shows the same port 251 where the camera 37 is pointed straight on at the port, resulting in the pins appearing to be exactly in the middle of the circles. If the camera 37 sees and transmits the image of FIG. 15, the software will know to move down in the Y axis in order to move the plug 19 closer to the desired mating position shown in FIG. 16.

Figure 17:
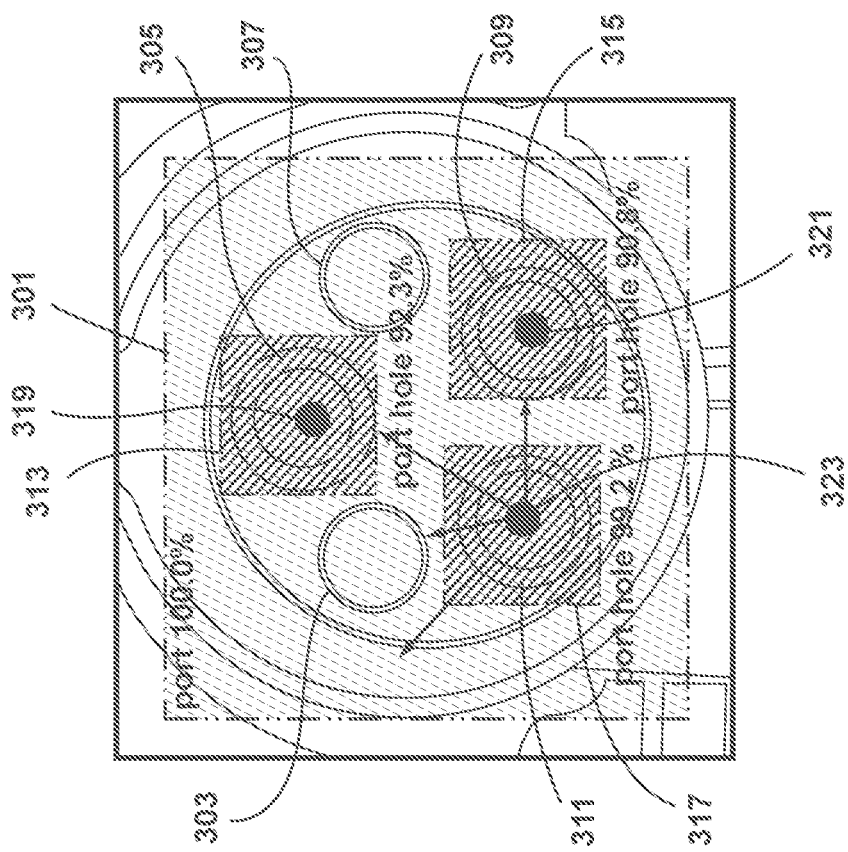
FIG. 17 is a schematic diagram illustrative of operation of an illustrative embodiment.

FIG. 17 is a screenshot of a display produced by the computer vision software to further illustrate its operation. In particular, FIG. 17 illustrates a large square bounding box 301 which surrounds all five of the charging port circles 303, 305, 307, 309, 311 of the vehicle's charging port. Three of these circles 305, 309, 311, so-called "main' circles, are encompassed by a respective smaller square bounding box 313, 315, 317. Within each smaller square bounding box is a respective pin image 319, 321, 323, which represents the position of three respective conductive male pins of the charging port of an electric vehicle as detected by the computer vision camera 37.

Figure 18:
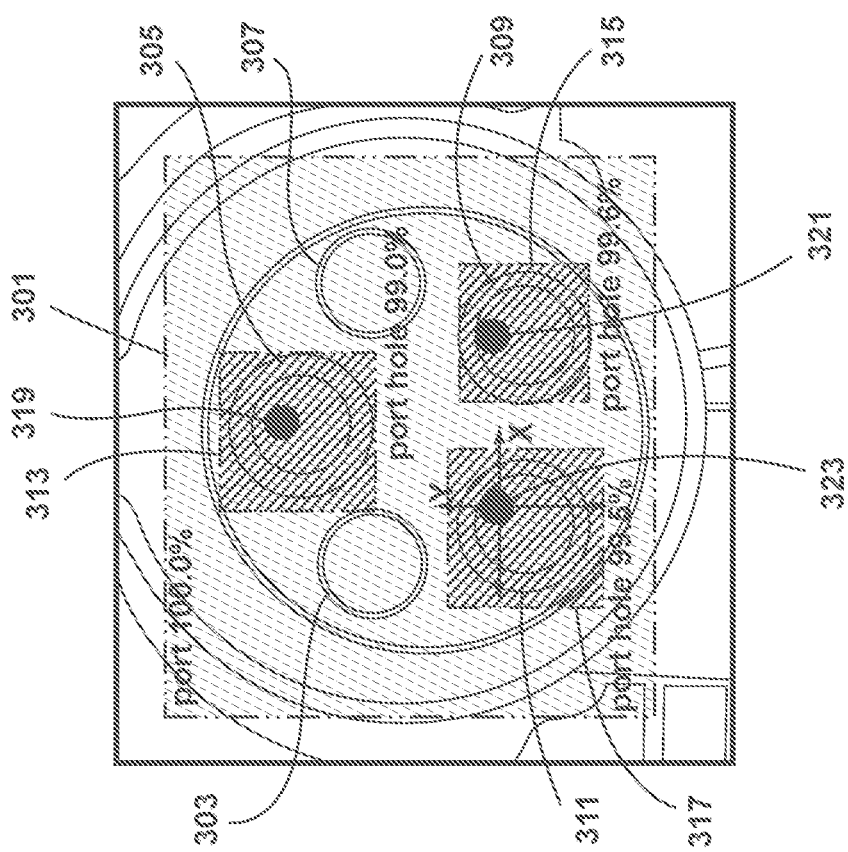
FIG. 18 is a schematic diagram illustrative of operation of an alternate embodiments.

In the example of FIG. 17, because the pin 323 is closer to the right edge of the circle 311 in the X axis, the program determines that the camera 37 (and thus the plug 19 since the camera 37 is in the middle of the plug 19) needs to move to the left in order to get closer to proper mating position. The amount of offset of the pin 323 from the center of the circle 311 is used to determine approximately how much to the left the plug 19 needs to move so that the pin 323 is centered. Similarly, for the Y axis, the pin 323 is closer to the top of the circle 311, which means that the plug 19 needs to move down. In an illustrative embodiment, the other pins 319, 321 are similarly analyzed, and the software uses an average of the three X offsets and three Y offsets to determine the actual X and Y distances the plug 19 will be moved. In FIGS. 17 and 18, the percentages shown are the live representations of how confident the software is that the object detected is what it thinks it is. For example, in the image of FIG. 17, the software is 100% confident that it is looking at a charging port, and about 99% confident that the top circle is what the software calls a "port hole."

In other embodiments, the offset of the pin to other features of the port may be used to calculate the X and Y movement to be imparted to the plug, for example, like the other circles or the edge of the port, as shown in FIG. 18. Additionally, while the illustrative embodiment of FIG. 17 uses three pins, the smaller pins located in the other 2 smaller circles may also be used in alternate embodiments.

For the purposes of this disclosure, a computer readable medium or memory stores computer data, which data can and typically does include computer program code that is executable by a computer, in machine readable form. By way of example, and not limitation, a computer readable medium or memory may comprise computer readable storage media, for tangible or fixed storage of data, or communication media for transient interpretation of code-containing signals. Computer readable storage media or "memory,", as used herein, refers to non-transitory physical or tangible storage (as opposed to signals) and includes without limitation volatile and non-volatile, removable and non-removable storage media implemented in any method or technology for the tangible storage of information such as computer-readable instructions, data structures, program modules or other data. Computer readable storage media or memory includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desire information or data or instructions and which can be accessed by a computer or processor. In various embodiments, when suitable computer program code is loaded into and executed by a computer, the computer becomes a specially configured apparatus.

Figure 19:
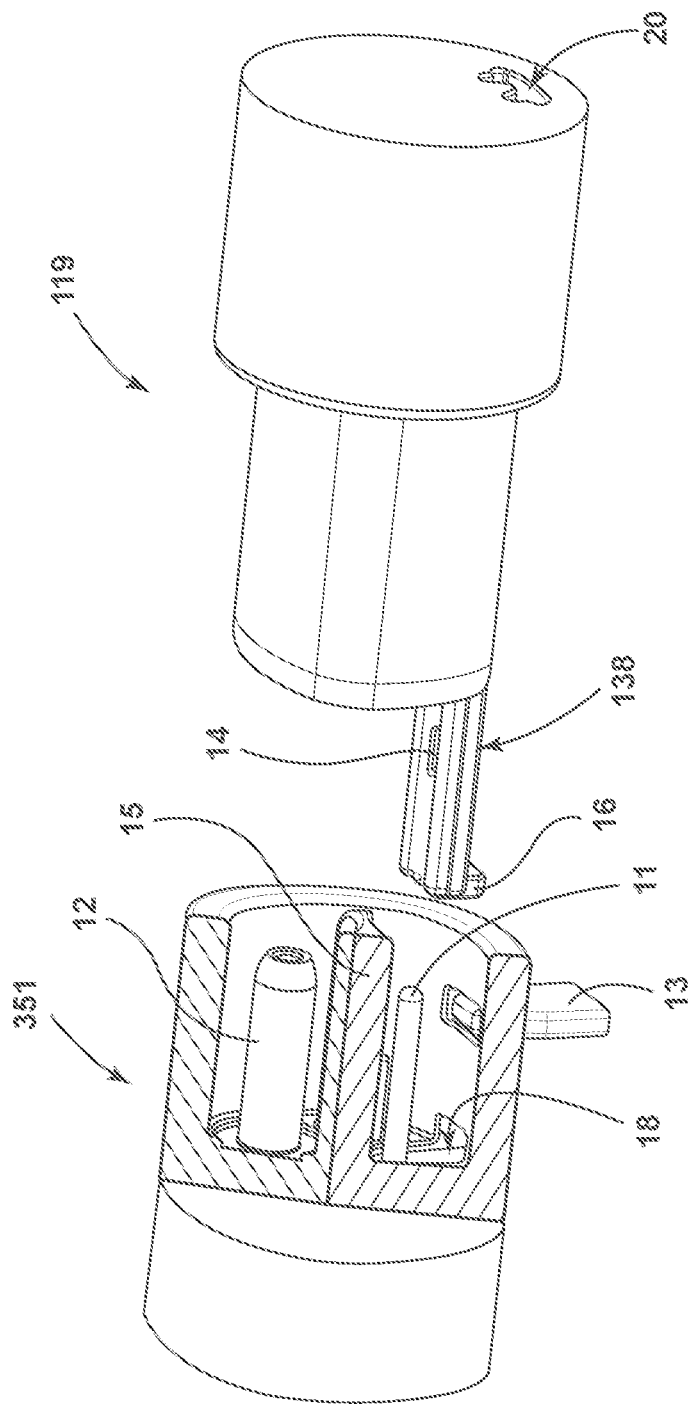
FIG. 19 is a partial sectional side perspective view schematically illustrating a first step in an illustrative process of interconnecting a charging port to a charging connector.

FIGS. 19-30 further illustrates the illustrative embodiment of FIGS. 7-18 particularly in the process of attaching a charging connector 119 to a charging port 351 of a Tesla vehicle. FIG. 19 shows the charging connector 119 after it has been aligned with the port 351 via the computer vision procedure discussed above. As may be seen, the connector 119 has an "L" shaped latching member 138, which includes a vertical tip 16 extending from a horizontal portion 20. In an illustrative embodiment, the latching member 138 is formed as a single unitary part, which has a locking pin receptacle hole 14 formed therein, but may be formed in other manners in other embodiments. FIG. 19 further illustrates an opening 20 through which the latching member 138 may slide.

Figure 20:
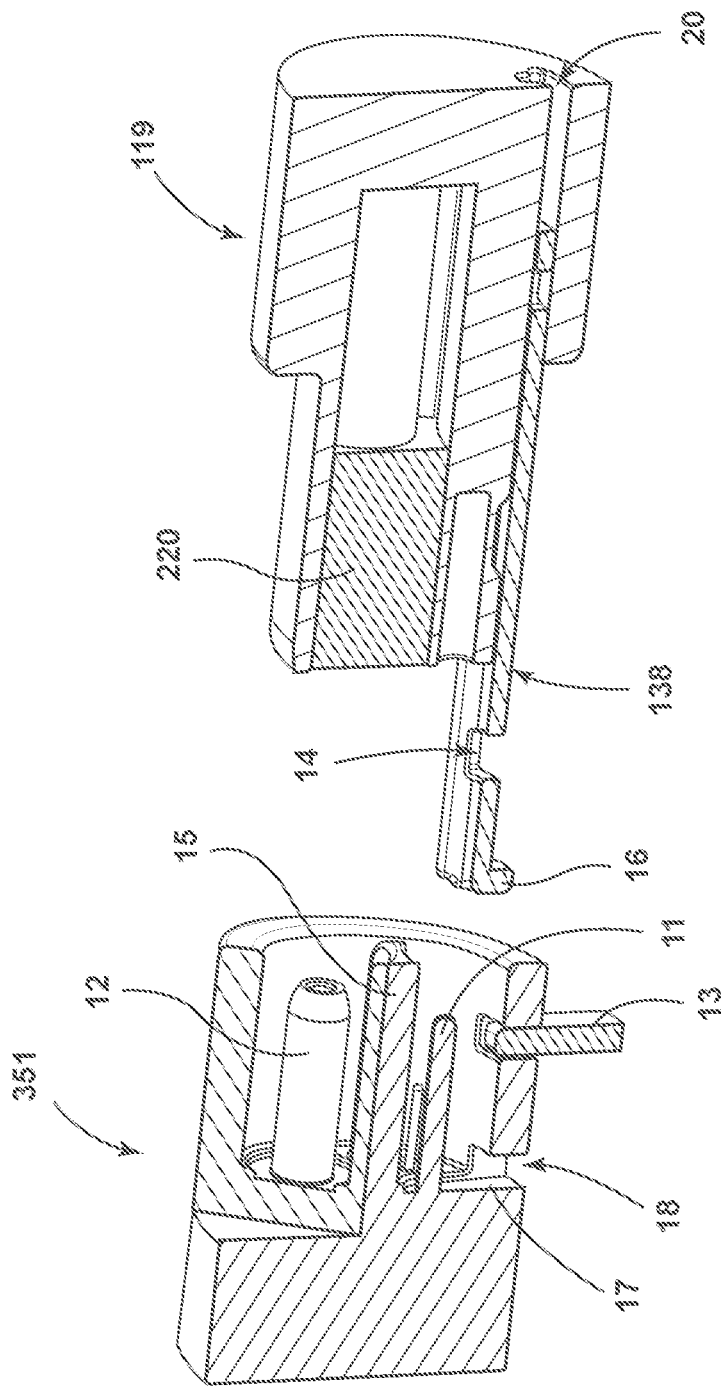
FIG. 20 is a second partial side sectional perspective view further illustrating the step of FIG. 19.
Figure 21:
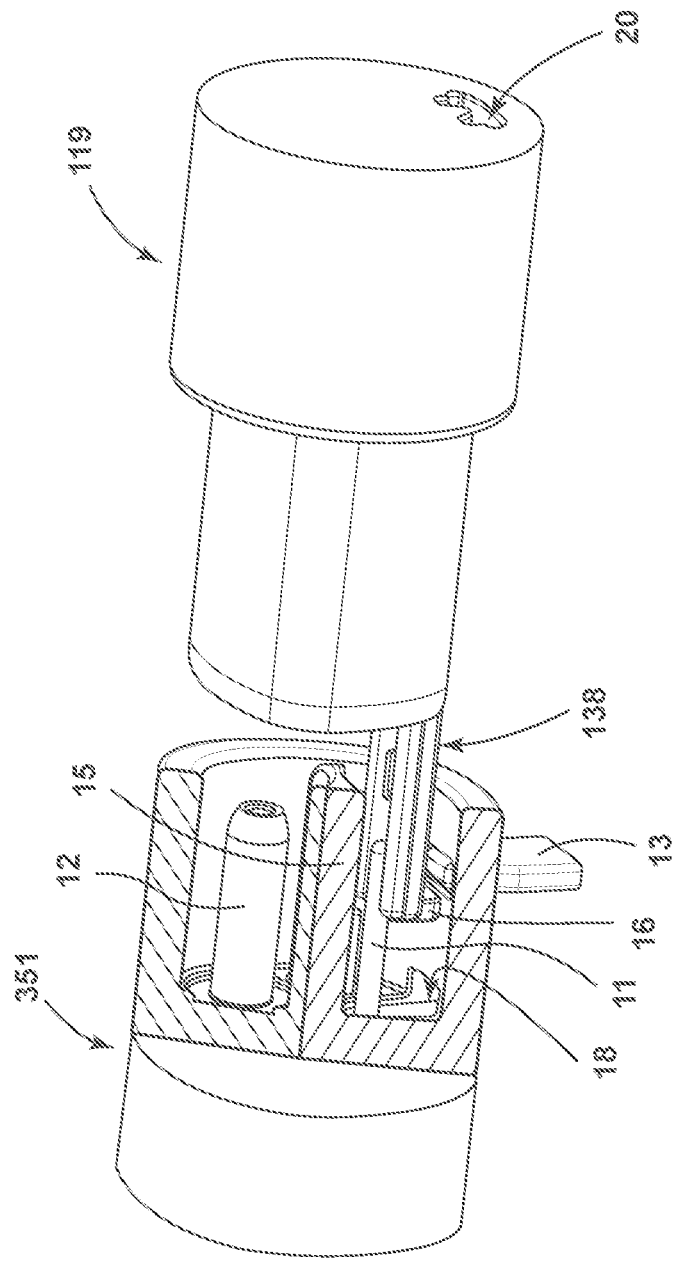
FIG. 21 is a partial side perspective view illustrating a second step in the illustrative process of interconnecting a charging port to a charging connector.
Figure 22:
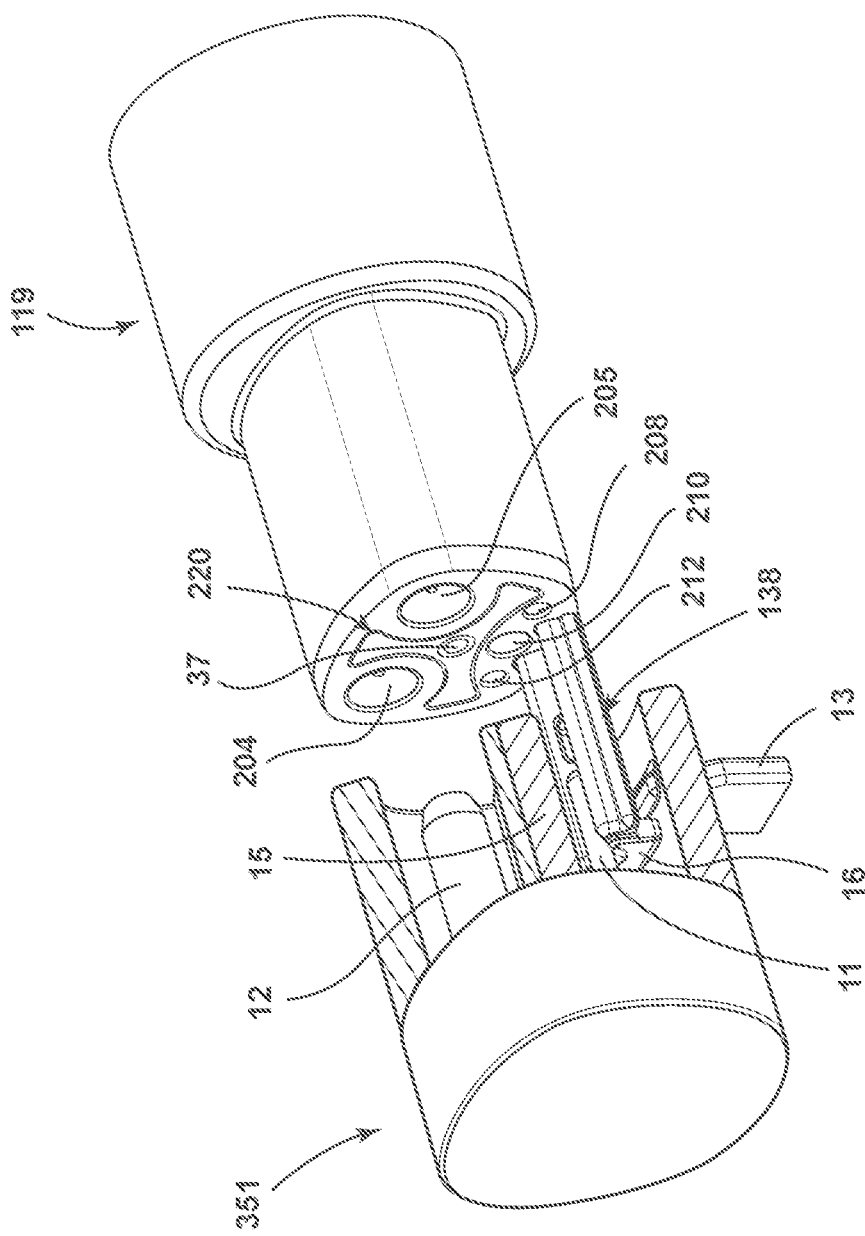
FIG. 22 is a side perspective view further illustrating the second step of FIG. 21.

The charging port 351 includes first and second electrically conductive pins 11, 12 and a horizontal structural member 15, as well as a locking pin 13 and a cavity or hole 18 formed adjacent a vertical rear surface 17 (FIG. 20). In operation, the robot begins to move the charging connector 119 horizontally towards the charging port 351 as shown in FIGS. 21 and 22. The latching member 138 enters an opening or passageway in the charging port 351 which leads to the cavity 18, and the conductor pin 11 enters a channel formed in the upper surface of the latching member 138.

FIG. 22 illustrates five charging port holes 204, 206, 208, 210, 212 of the charging connector 119, as well as the tri-tip member 220 and the attached computer vision camera 37. The electrical conductor pin 12 shown in FIG. 22 will eventually enter port hole 204, and the conductor pin 11 will enter port hole 210. Interior surface projection 15 of the port 351 will eventually enter a channel created as the tri-tip component 220 and its camera 37 move "back" or retract into the charging connector 119 during the plug-in process, as described in more detail below and shown in FIG. 27. When interconnecting with the Tesla port 351, each of the port holes 204, 206, 208, 210, and 212 will each receive a respective charging pin of the port 351.

Figure 13:
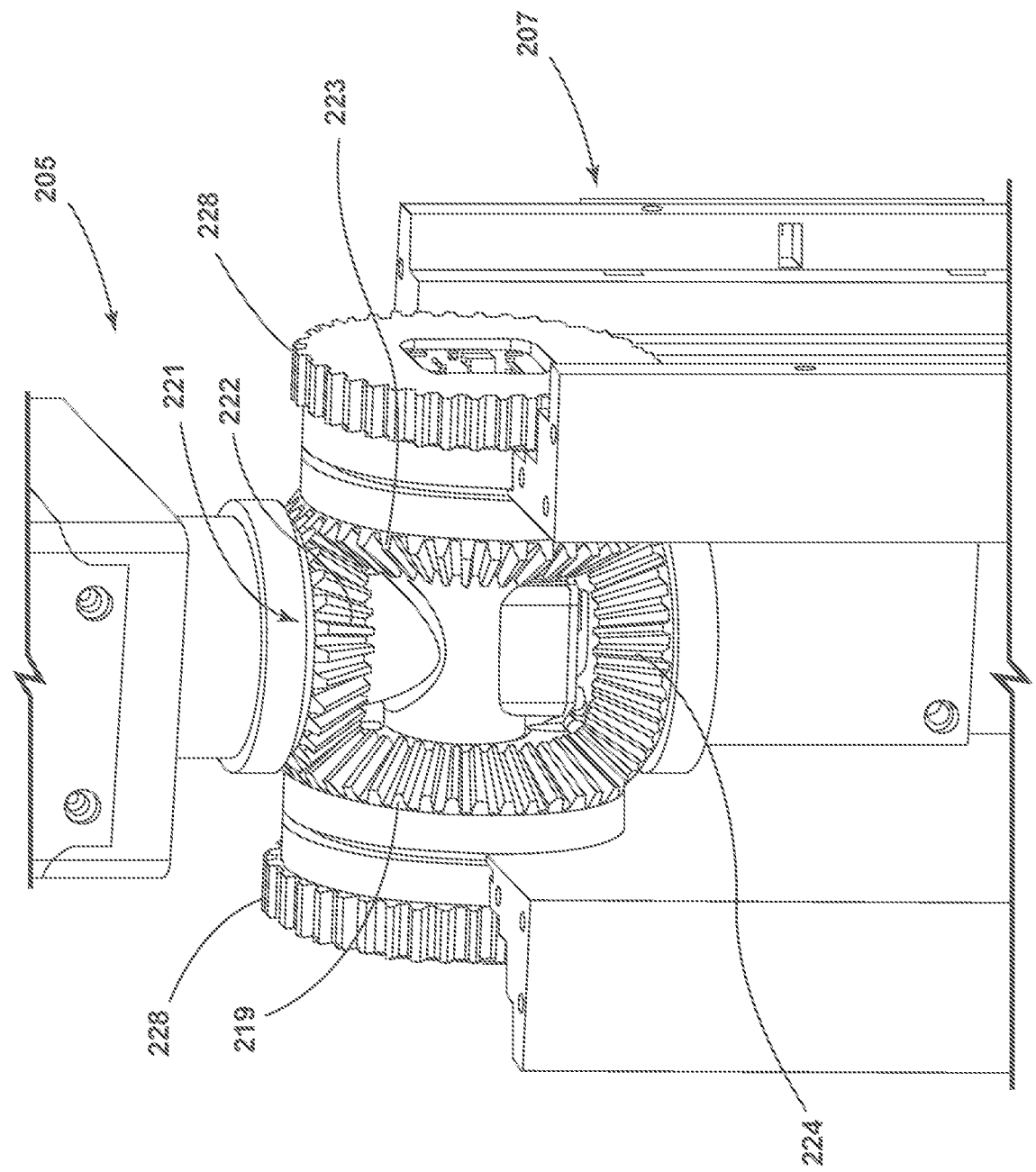
FIG. 13 is a perspective view of a differential gear system according to an illustrative embodiment.
Figure 23:
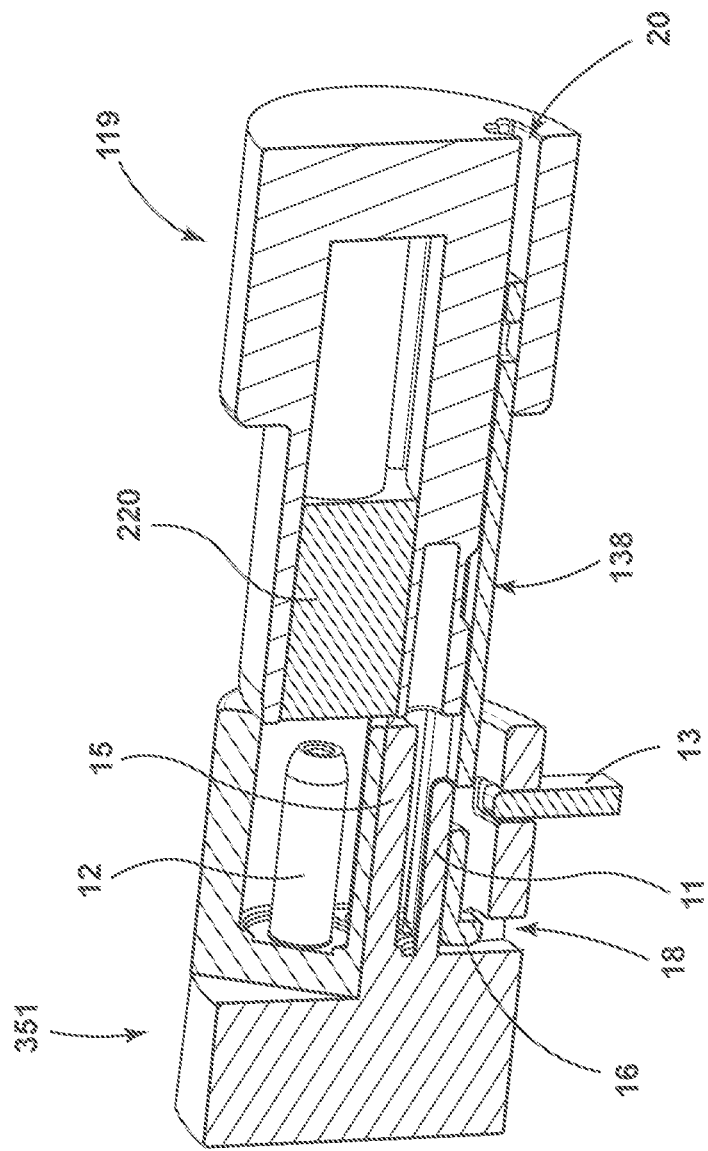
FIG. 23 is a partial side perspective view illustrating a third step in the illustrative process of interconnecting a charging port to a charging connector.
Figure 24:
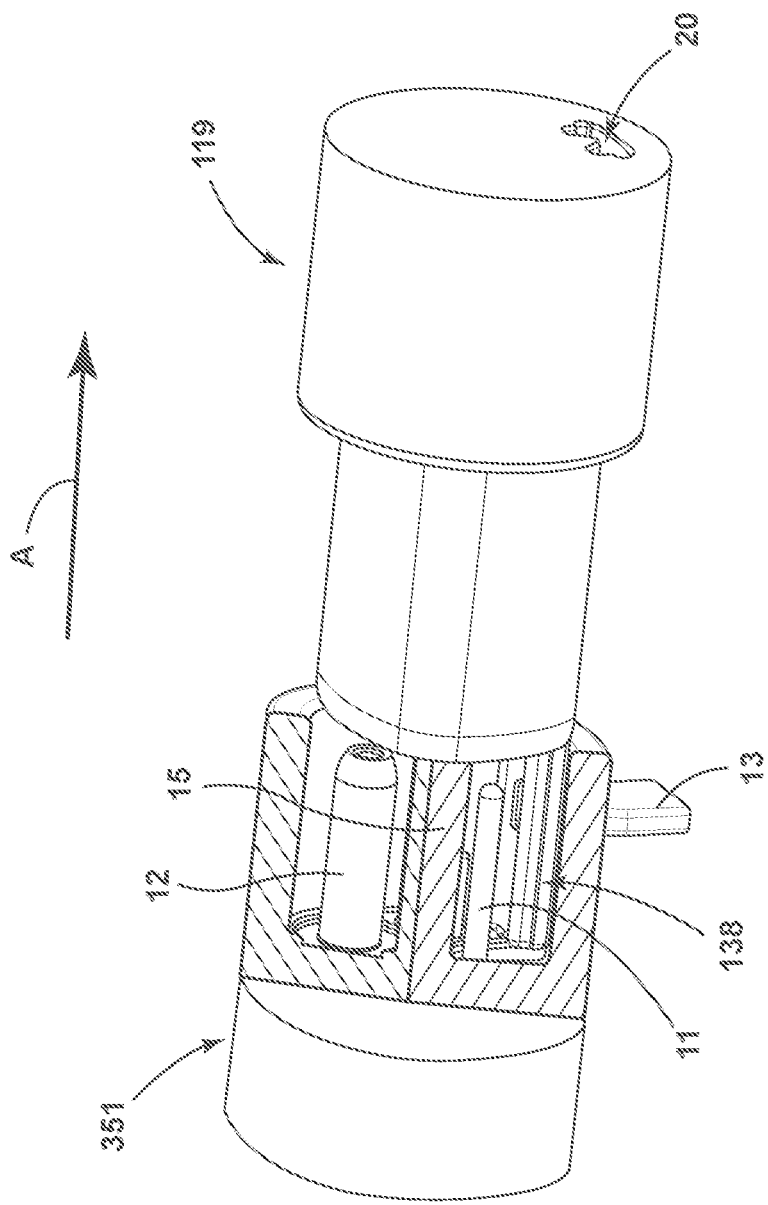
FIG. 24 is a partial side perspective view illustrating a fourth step in the illustrative process of interconnecting a charging port to a charging connector.

FIG. 23 illustrates the position where the charging connector 119 has been advanced to the point where the tip 16 of the latching member 138 is disposed directly above the cavity 18 in a position where downward vertical movement of the member 138 will cause the tip 16 to move into the cavity 18, thereby locking the tip 16 in the cavity 18. This locked position is illustrated in FIG. 24. In one illustrative embodiment, the downward movement of the tip 16 is caused and controlled by the robot, for example, through joint 205 (FIG. 13).

In illustrative embodiments, in order to maintain alignment of the port 351 and charging connector 119 while accommodating this downward vertical movement of the tip 16, the connector 119 is initially offset a pre-set known distance from the computer vision aligned position as initially established, such that when the locked position is achieved, the connector 119 and port 351 are properly aligned to achieve plug-in. In illustrative embodiments, the tip 16 need only move a short distance, e.g. 2-3 millimeters, to achieve suitable engagement with the cavity 18.

Figure 25:
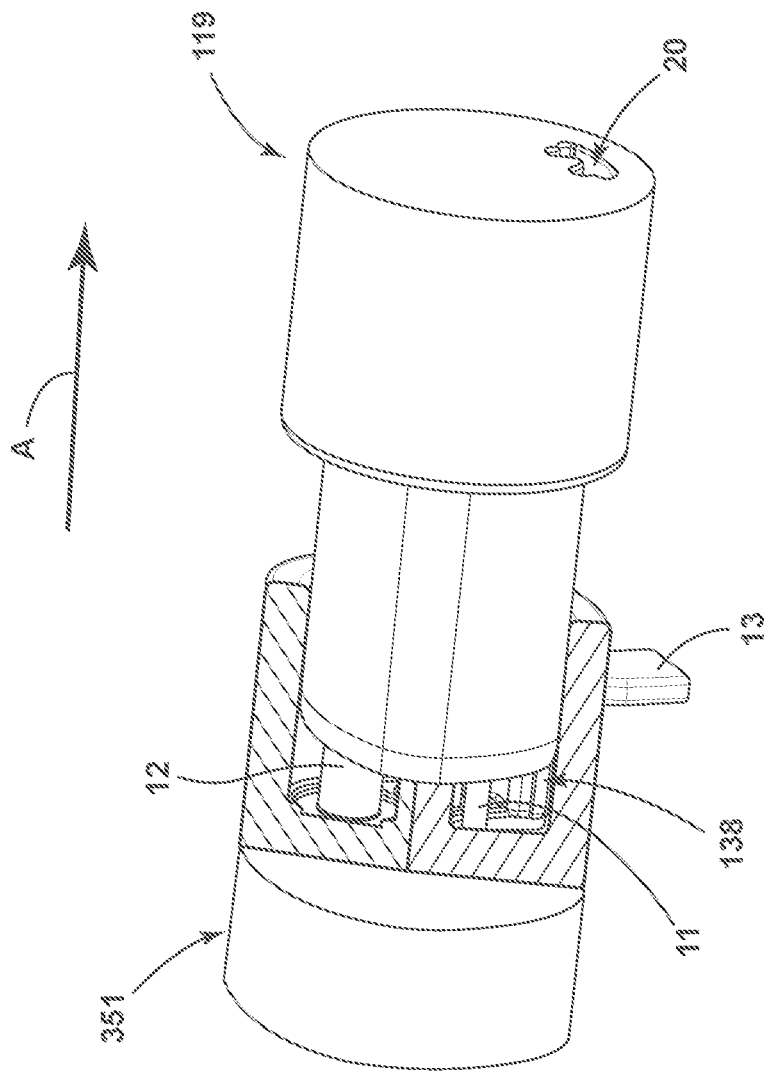
FIG. 25 is a partial side perspective view illustrating a fifth step in the illustrative process of interconnecting a charging port to a charging connector.
Figure 26:
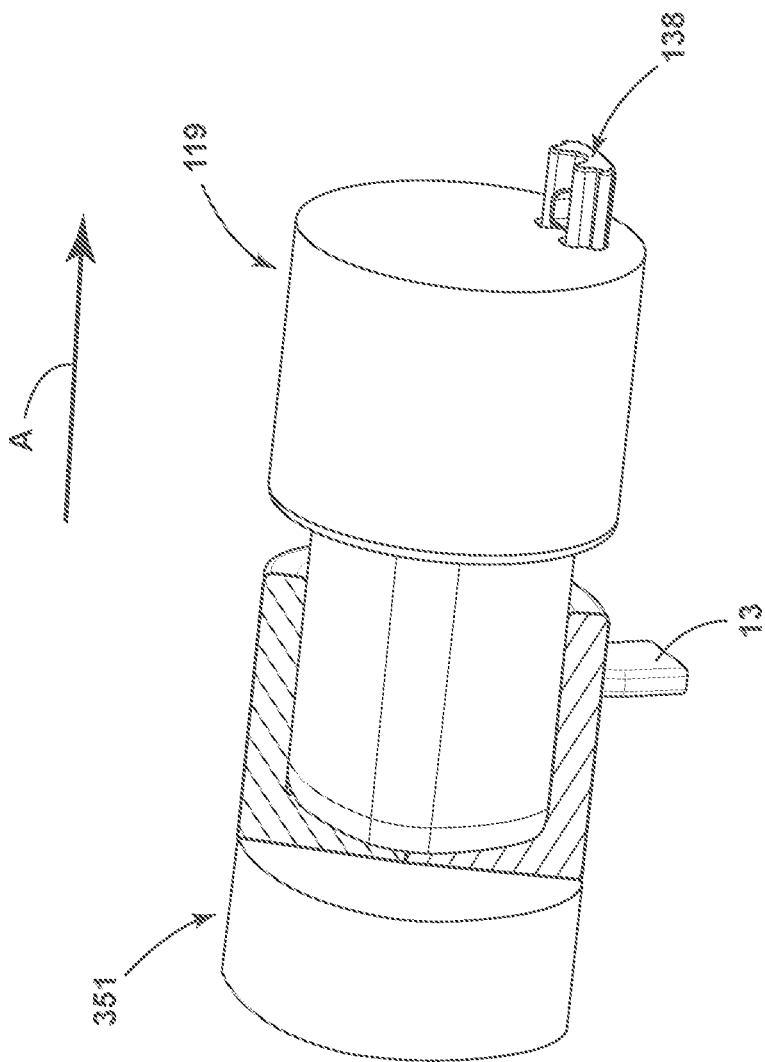
FIG. 26 is a partial side perspective view illustrating a sixth step in the illustrative process of interconnecting a charging port to a charging connector.
Figure 27:
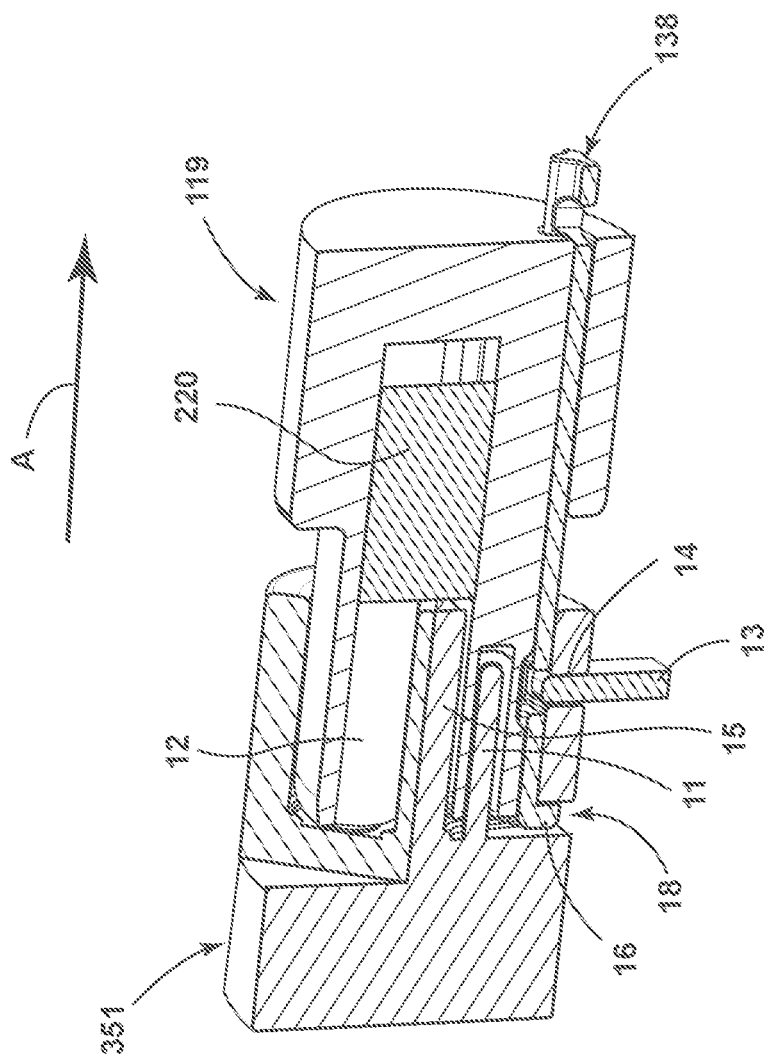
FIG. 27 is a partial side perspective view further illustrating the sixth step of FIG. 26.

Once in the locked position of FIG. 24, the latching member 138 is pulled in Direction "A," causing the charging connector 119 to begin to plug into the port 351, as shown in FIG. 25. Finally, the connector 119 is pulled into a fully connected position with the port 351 as shown in FIGS. 25 and 26. Charging begins, and the vehicle then inserts the locking pin 13 into the locking pin receptacle 14, as shown in FIG. 27. After charging is complete, the linear actuator 225 is actuated to pull the plug 119 out of the charging receptacle 351.

Figure 28:
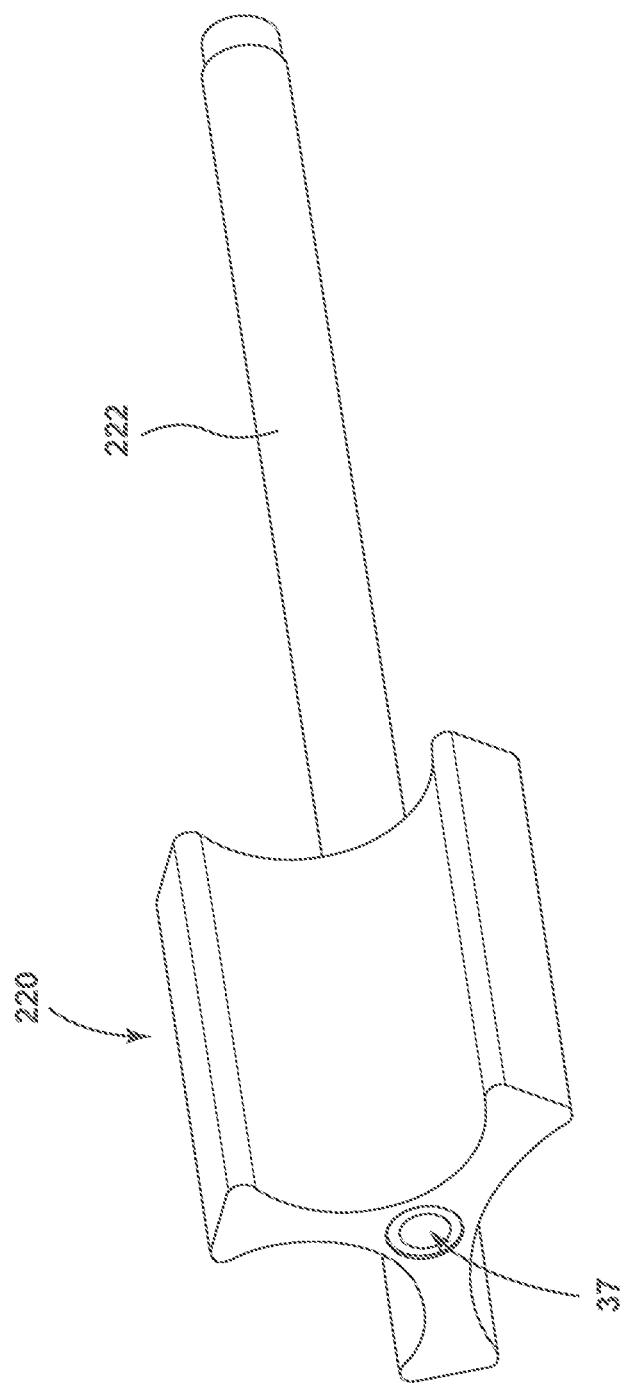
FIG. 28 is a side perspective view of a tri-tip camera mounting component of an illustrative embodiment.
Figure 29:
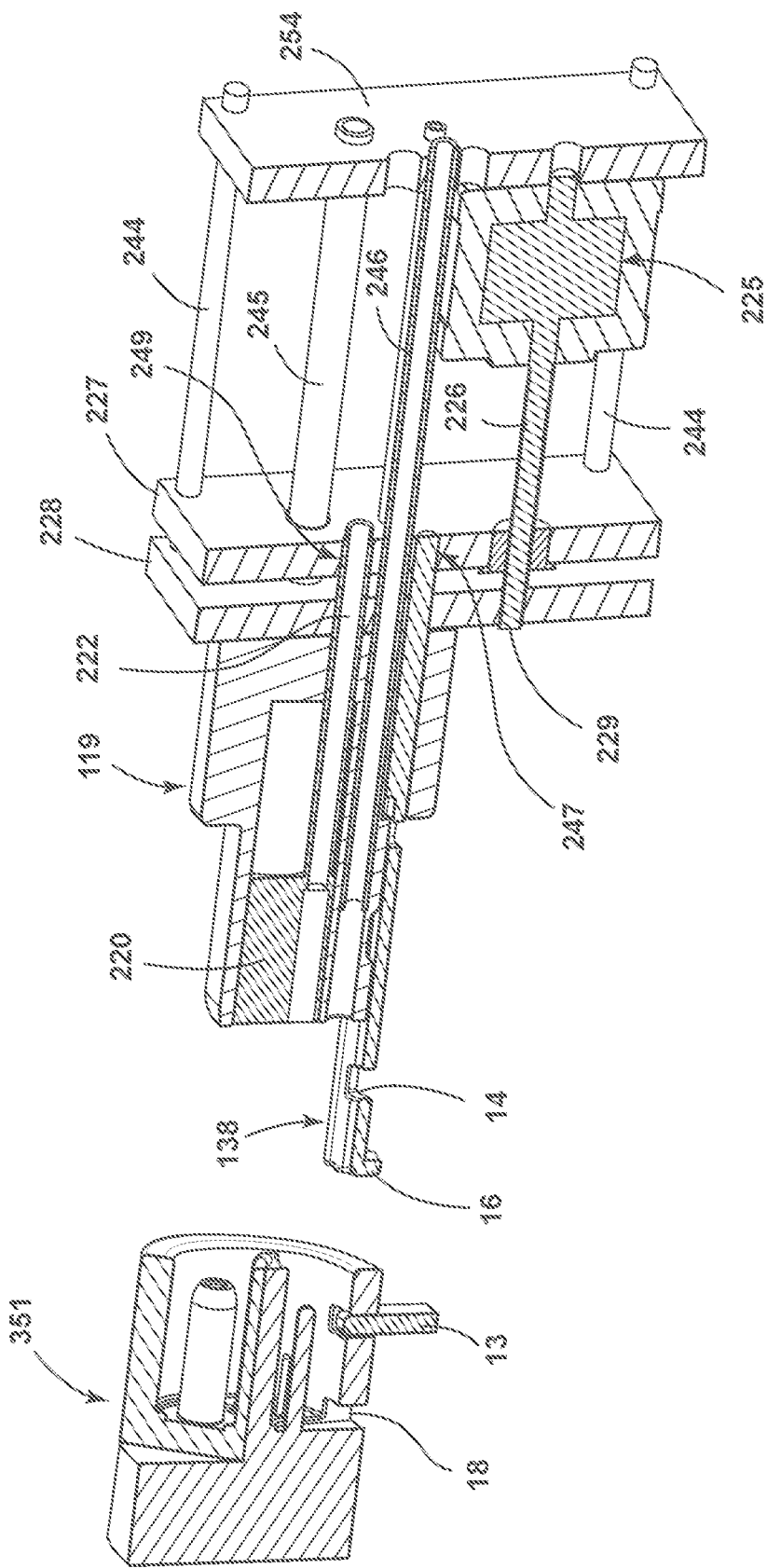
FIG. 29 is a side sectional view further illustrating apparatus for advancing and retracting a latch arm and tri-tip camera component according to an illustrative embodiment.
Figure 30:
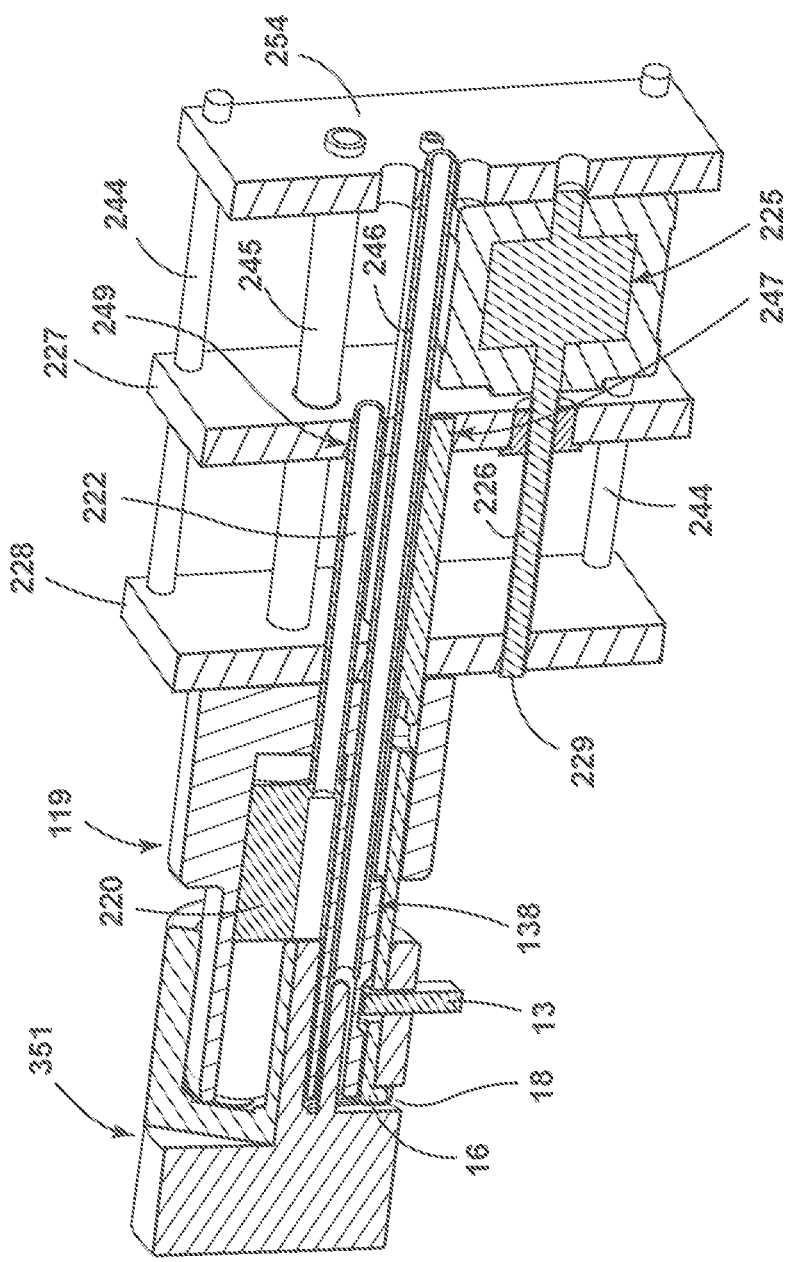
FIG. 30 is a side sectional view further illustrating the apparatus of FIG. 29.

FIGS. 28-30 further illustrates apparatus for advancing and retracting the latch arm 138 and tri-tip camera member 220 in an illustrative embodiment. In FIG. 29, the latch arm 138 and camera 37 are in the extended position spaced apart from the vehicle charging port 351. As may be seen, the rear end 249 of the tube portion 222 of the camera member 220 and the rear end 247 of the latch arm 138 are affixed to the movable plate 227. This interconnection or affixation may be accomplished in a number of manners in various embodiments. In one embodiment, the plate 227 is 3d printed and the latch arm and tri point tube are placed into position during printing such that plate 227 is printed around them. Alternatively, all three components could be manufactured out of one piece of metal or molded out of one piece of plastic. In other embodiments, the arm and tube could be ultrasonic welded or fastened by plastic adhesive into place.

FIG. 29 schematically illustrates a conduit tube 245 through which electrical leads pass to the camera 37 and a central support tube 246, on which the plate 227 may slide toward and away from the vehicle port 351. In an illustrative embodiment, five individual tubes are employed to conduct respective electrical leads to a respective one of the charging pins of the charging ports 204, 206, 208, 210, 212 of the charging connector 119. In an illustrative embodiment, some of the pins are not power pins but rather signal and ground pins.

As further shown in FIG. 29, the threaded shaft 226 of the linear actuator 225 engages and drives the plate 227 along with the attached latch arm 138 and camera 37 towards and away from the port 351 and is configured such that its tip 229 slidably passes in and out of an opening in the plate 228. Four support arms, e.g. 244, affixed at respective corners of the base plate 254 are affixed at their opposite ends to the plate 228. The support arms 244 pass through respective holes in the plate 227 sized such that the plate 227 may slidably ride on them towards and away from the vehicle charging port 351. In illustrative embodiments the plates 254, 227, 228 may be fabricated of a suitable plastic or metal.

FIG. 30 illustrates the structure of FIG. 29 in the state where the latch tip 16 has been engaged with the cavity 18 of the vehicle charging port 351, and the actuator 225 has been activated to pull the plate 227 back in Direction "A," thereby causing the charging connector 119 to plug into the vehicle's charging port 351. This is the same position as illustrated in FIGS. 26 and 27. Once the vehicle is charged, the linear actuator 225 moves the metal plate 227 in a direction opposite that of direction "A," which extends the latch 138 again and "pushes" the charging connector 119 out of the charging receptacle 351.

From the foregoing, those skilled in the art will appreciate that various adaptations and modifications of the just described illustrative embodiments can be configured without departing from the scope and spirit of the invention. Therefore, it is to be understood that, within the scope of the appended claims, the invention may be practiced other than as specifically described herein.

What is claimed is:

1. An apparatus for interconnecting a vehicle charging connector with a charging port of a vehicle, the apparatus comprising:
   a latch arm moveable toward and away from the charging port, the latch arm being so positioned and having a length selected such that the latch arm is extendable into an interior of an opening of the charging port;
   a tip portion positioned on the latch arm so as to be insertable downwardly into a cavity formed in the interior of the opening of the charging port so as to enable the charging port and the vehicle charging connector to be pulled together to establish electrical interconnection between them;
   a camera mounting member having a tube portion and being slidably mounted in the vehicle charging connector, a rear end of the tube portion and a rear end of the latch arm being attached to a movable plate; and
   a linear actuator configured to:
      drive the latch arm towards and away from the vehicle charging connector and wherein the vehicle charging connector is a part of a robot configured to move the tip portion of the latch arm downwardly into the cavity; and
      drive the movable plate along with the attached latch arm and the camera mounting member towards and away from the charging port.

2. An apparatus for interconnecting a vehicle charging connector with a charging port of a vehicle, the apparatus comprising:
   a latch arm moveable toward and away from the charging port, the latch arm being so positioned and having a length selected such that the latch arm is extendable into an interior of an opening of the charging port;
   a tip portion positioned on the latch arm so as to be insertable downwardly into a cavity formed in the interior of the opening of the charging port so as to enable the charging port and the vehicle charging connector to be pulled together to establish electrical interconnection between them;
   a camera mounting member having a tube portion and being slidably mounted in the vehicle charging connector, a rear end of the tube portion and a rear end of the latch arm being attached to a movable plate; and
   a linear actuator configured to drive the movable plate along with the attached latch arm and the camera mounting member towards and away from the charging port.

3. An apparatus for interconnecting a vehicle charging connector with a charging port of a vehicle, the apparatus comprising:
   a latch arm moveable toward and away from the charging port, the latch arm being so positioned and having a length selected such that the latch arm is extendable into an interior of an opening of the charging port;
   a tip portion positioned on the latch arm so as to be insertable downwardly into a cavity formed in the interior of the opening of the charging port so as to enable the charging port and the vehicle charging connector to be pulled together to establish electrical interconnection between them, wherein the vehicle charging connector comprises an array of receptacles configured to receive and establish electrical connection with respective mating pins of the charging port;
   a camera located within the array of receptacles, the camera defining an X-Y plane, the camera being positioned to generate an electronic image of the charging port and a plurality of mating pins thereof;
   one or more processors, at least one processor being supplied with the electronic image; and
   a non-transitory computer readable medium or a plurality of non-transitory computer readable media storing executable instructions, which, when executed by the one or more processors, cause performance of the following operations:
      establish a plurality of boundary boxes which locate and identify the charging port and a plurality of interconnection ports located within the charging port; and calculate an offset distance selected to correct for misalignment of the vehicle charging connector with respect to the charging port.

* * * * *